(12) United States Patent
Guenther et al.

(10) Patent No.: US 7,410,433 B2
(45) Date of Patent: Aug. 12, 2008

(54) BAT HANDLE WITH OPTIMAL DAMPING

(75) Inventors: Douglas G. Guenther, Wheaton, IL (US); Mark A. Fritzke, Portland, OR (US); Bradley L. Gaff, Woodridge, IL (US); Michael D. Eggiman, North Plains, OR (US)

(73) Assignee: Wilson Sporting Goods Co., Chicago, IL (US)

( * ) Notice: Subject to any disclaimer, the term of this patent is extended or adjusted under 35 U.S.C. 154(b) by 176 days.

(21) Appl. No.: 11/414,098

(22) Filed: Apr. 28, 2006
(Under 37 CFR 1.47)

(65) Prior Publication Data
US 2006/0293130 A1 Dec. 28, 2006

Related U.S. Application Data

(63) Continuation-in-part of application No. 10/833,747, filed on Apr. 28, 2004, now Pat. No. 7,097,578, which is a continuation-in-part of application No. 10/115,593, filed on Apr. 2, 2002, now Pat. No. 6,743,127.

(51) Int. Cl.
*A63B 59/06* (2006.01)
(52) U.S. Cl. .................... 473/567; 473/520
(58) Field of Classification Search ............. 473/457, 473/519, 520, 564–568
See application file for complete search history.

(56) References Cited

U.S. PATENT DOCUMENTS

| | | |
|---|---|---|
| 537,927 A | 4/1895 | Kennedy |
| 546,540 A | 9/1895 | Kennedy |
| 729,639 A | 6/1903 | McCoy |
| 1,509,733 A | 9/1924 | Langford |
| 2,379,006 A | 6/1945 | Johnson |
| 2,992,828 A | 7/1961 | Stewart ................ 273/80 |
| D197,180 S | 12/1963 | Salisbury ............... D34/5 |
| 3,246,894 A | 4/1966 | Salisbury ............... 273/26 |
| 3,377,066 A | 4/1968 | Trowbridge ........... 273/72 |
| 3,392,976 A | 7/1968 | Hayes ................... 273/72 |
| 3,479,030 A | 11/1969 | Merola .................. 273/72 |
| 3,830,496 A | 8/1974 | Reizer ................... 273/72 |
| 3,877,698 A | 4/1975 | Volpe .................... 273/72 |
| 3,921,976 A | 11/1975 | Lane ..................... 273/26 |

(Continued)

FOREIGN PATENT DOCUMENTS

JP 27814/1989 8/1989

(Continued)

OTHER PUBLICATIONS

Excerpts from the Easton Baseball and Softball Catalogues for the years 1995 through 1998.

(Continued)

*Primary Examiner*—Mark S Graham
(74) *Attorney, Agent, or Firm*—Terence P. O'Brien

(57) ABSTRACT

A bat has an elongate tubular striking member of a first material, and an elongate handle member of a second material. The handle may be of composite material laid up in selected layers and orientation to produce selected weight distribution, strength, and stiffness and improved batting capabilities. The striking member and handle member may have juncture sections which are substantially rigidly interconnected through mating configurations.

49 Claims, 11 Drawing Sheets

U.S. PATENT DOCUMENTS

| | | | |
|---|---|---|---|
| 3,955,816 A | 5/1976 | Bratt | 273/26 |
| 4,025,377 A | 5/1977 | Tanikawa | 156/242 |
| 4,032,143 A | 6/1977 | Mueller et al. | 273/72 |
| 4,323,239 A | 4/1982 | Ishii | 273/72 |
| 4,343,467 A * | 8/1982 | Newcomb et al. | 473/567 |
| 4,351,786 A | 9/1982 | Mueller | 264/46.7 |
| 4,399,996 A | 8/1983 | Boyce | 273/26 |
| 4,505,479 A | 3/1985 | Souders | 273/72 |
| 4,555,111 A | 11/1985 | Alvarez | 273/26 |
| 4,569,521 A | 2/1986 | Mueller | 273/72 |
| 4,572,508 A | 2/1986 | You | 273/72 |
| 4,682,773 A | 7/1987 | Pomilia | 273/26 |
| 4,685,682 A | 8/1987 | Isabell | 273/162 |
| 4,746,117 A | 5/1988 | Noble et al. | 273/72 |
| 4,834,370 A | 5/1989 | Noble et al. | 273/72 |
| 4,848,745 A | 7/1989 | Bohannan et al. | 273/72 |
| 4,951,948 A | 8/1990 | Peng | 273/72 |
| 5,094,453 A | 3/1992 | Douglas et al. | 273/72 |
| 5,131,651 A | 7/1992 | You | 273/72 |
| 5,180,163 A | 1/1993 | Lancot et al. | 273/72 |
| 5,219,164 A | 6/1993 | Peng | 273/72 |
| 5,303,917 A | 4/1994 | Uke | 273/72 |
| 5,364,095 A | 11/1994 | Easton et al. | 273/72 |
| 5,380,003 A | 1/1995 | Lancot | 273/72 |
| 5,409,214 A | 4/1995 | Cook | 273/72 |
| 5,415,398 A | 5/1995 | Eggiman | 273/72 |
| 5,511,777 A | 4/1996 | McNeely | 273/72 |
| 5,516,097 A | 5/1996 | Huddleson | 273/26 |
| 5,524,884 A | 6/1996 | Haines | 273/67 |
| 5,593,158 A | 1/1997 | Filice et al. | 473/520 |
| 5,653,643 A | 8/1997 | Falone et al. | 473/300 |
| 5,759,113 A * | 6/1998 | Lai et al. | 473/321 |
| 5,833,561 A | 11/1998 | Kennedy et al. | 473/564 |
| 6,022,282 A | 2/2000 | Kennedy et al. | 473/567 |
| 6,050,908 A | 4/2000 | Muhlhausen | 473/457 |
| 6,056,655 A | 5/2000 | Feeney et al. | 473/567 |
| 6,086,490 A * | 7/2000 | Spangler et al. | 473/564 |
| 6,113,508 A | 9/2000 | Locarno et al. | 473/516 |
| 6,146,291 A | 11/2000 | Nydigger | 473/566 |
| 6,257,997 B1 | 7/2001 | Doble et al. | 473/516 |
| 6,485,382 B1 | 11/2002 | Chen | 473/566 |
| 6,625,848 B1 | 9/2003 | Schneider | 16/436 |
| 7,097,578 B2 | 8/2006 | Guenther et al. | 473/567 |
| 2004/0127310 A1* | 7/2004 | Hsu | 473/567 |

FOREIGN PATENT DOCUMENTS

| | | |
|---|---|---|
| JP | 327866/1992 | 11/1992 |
| JP | 182009/1994 | 4/1994 |
| JP | 117374/1996 | 5/1996 |
| JP | 43338/1998 | 2/1998 |
| JP | 52515/1998 | 2/1998 |
| JP | 201892/1998 | 8/1998 |
| JP | 54605/2001 | 2/2001 |
| JP | 95968/2001 | 4/2001 |
| JP | 11130/2002 | 1/2002 |
| WO | WO00/23151 | 4/2000 |

OTHER PUBLICATIONS

Softball Bat Vibration During the Swing and Impact: a Preliminary Analysis of Empirical Data, 1999.

Determining Baseball Bat Performance Using a Conservative Equations Model with Field Test Validation, Aug. 2000.

* cited by examiner

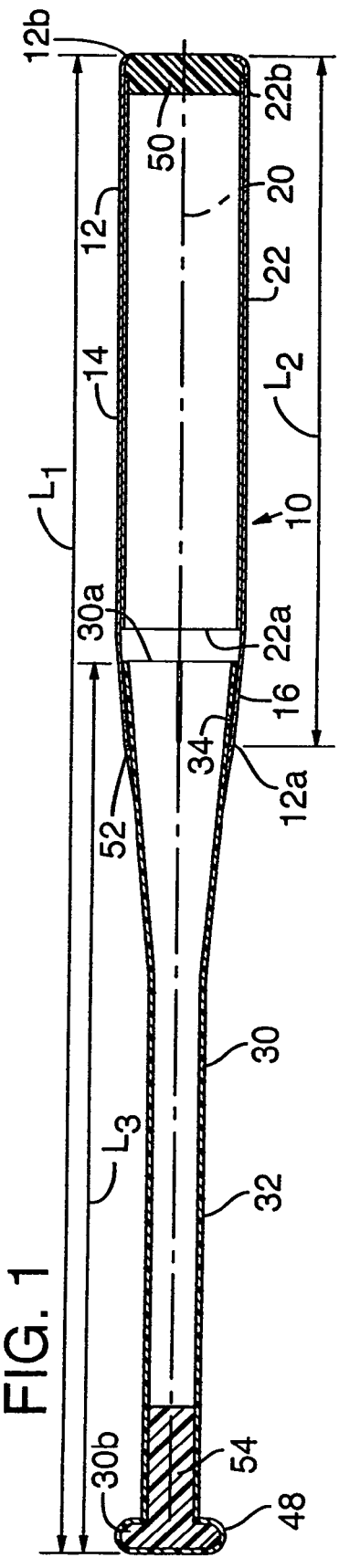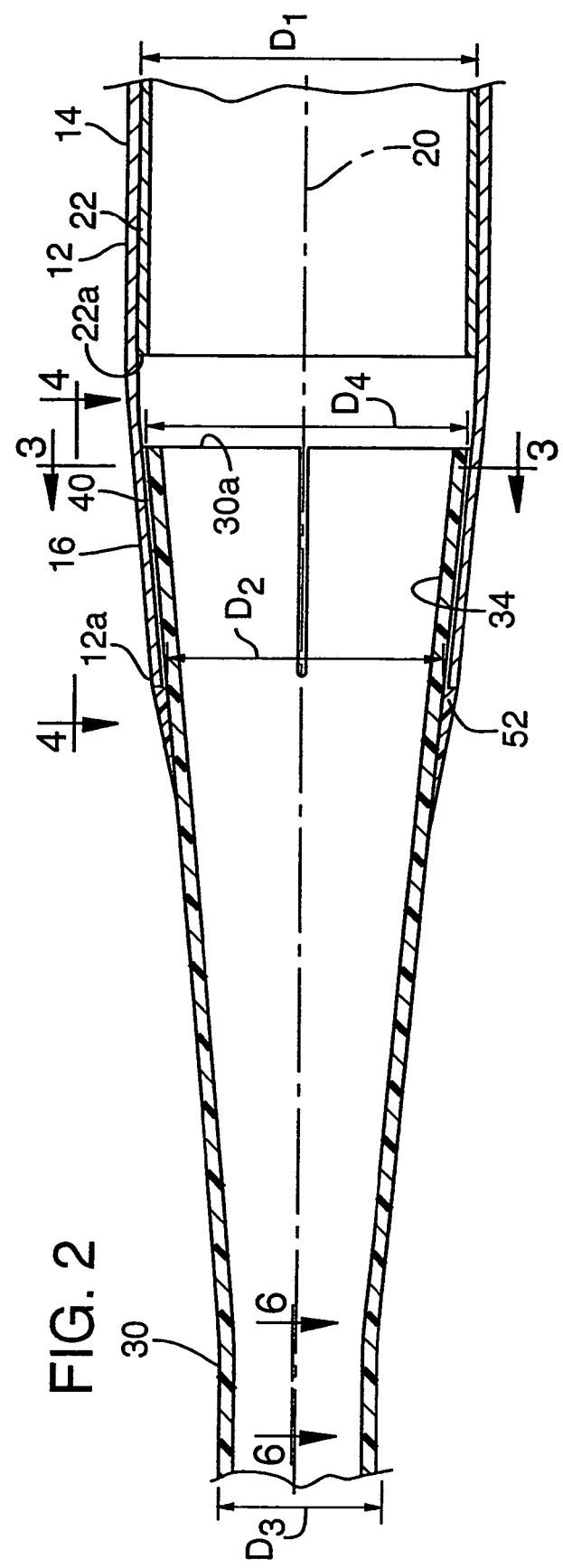
FIG. 1
FIG. 2

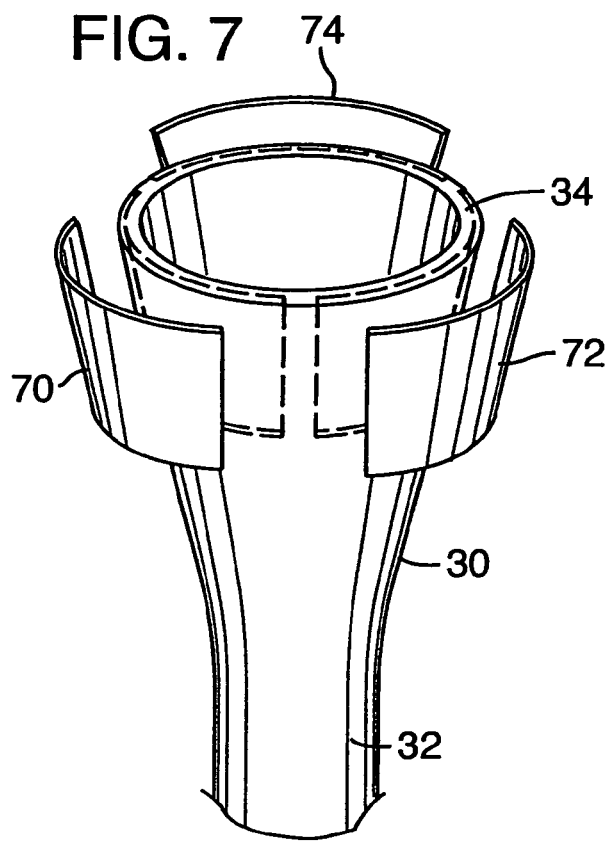
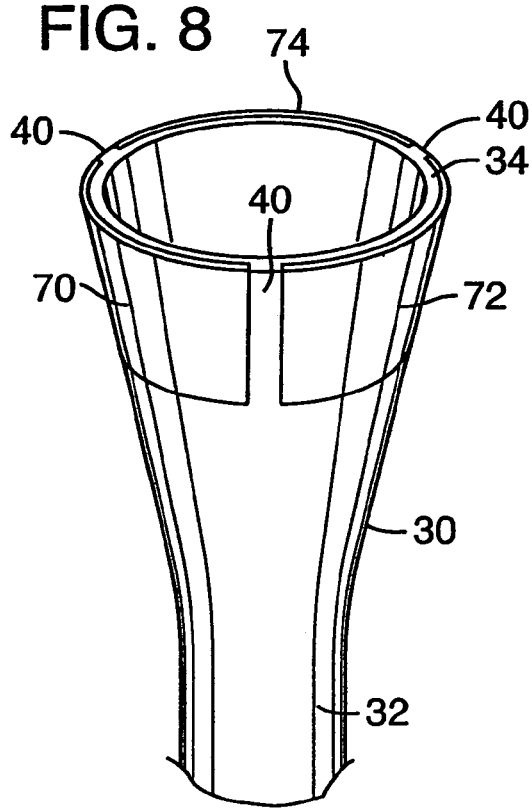
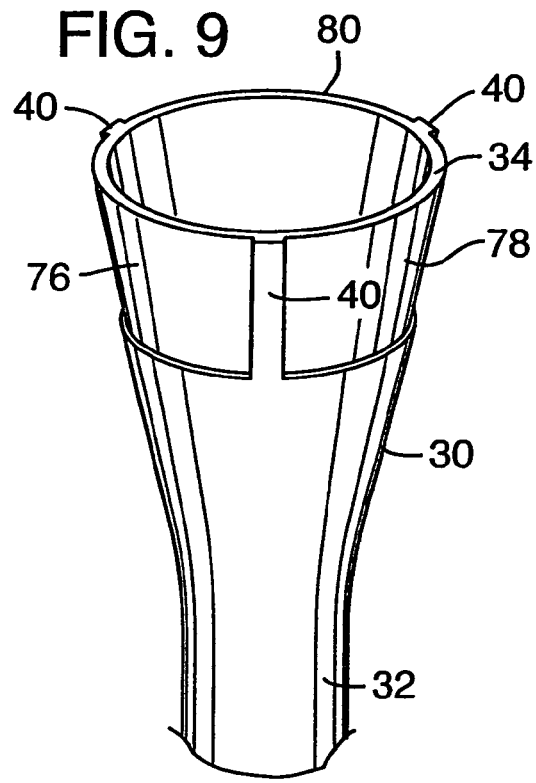

BAT HANDLE WITH OPTIMAL DAMPING

RELATED U.S. APPLICATION DATA

The present invention is a continuation-in-part of U.S. patent application Ser. No. 10/833,747 entitled "Bat Having Flexible Handle" filed on Apr. 28, 2004 now U.S. Pat. No. 7,097,578, by Guenther et al., which is a continuation-in-part of U.S. patent application Ser. No. 10/115,593, entitled "Bat With Composite Handle," filed on Apr. 2, 2002 now U.S. Pat. No. 6,743,127, by Eggiman et al.

FIELD OF THE INVENTION

This invention relates to a ball bat, and more particularly to a ball bat with a striking barrel member made to provide desired striking capabilities, and a handle member made to provide desired swinging capabilities.

BACKGROUND AND SUMMARY OF THE INVENTION

Tubular metallic baseball bats are well known in the art. A familiar example is a tubular aluminum bat. Such bats have the advantage of a generally good impact response, meaning that the bat effectively transfers power to a batted ball. This effective power transfer results in ball players achieving good distances with batted balls. An additional advantage is improved durability over crack-prone wooden bats.

Even though presently known bats perform well, there is a continuing quest for bats with better hitting capabilities. Accordingly, one important need is to optimize the impact response of a bat. Further, it is important to provide a bat with proper weighting so that its swing weight is apportioned to provide an appropriate center of gravity and good swing speed of impact components during use.

Generally speaking, bat performance may be a function of the weight of the bat, distribution of the weight, the size of the hitting area, the effectiveness of force transfer between the handle and the striking barrel, and the impact response of the bat. The durability of a bat relates, at least in part, to its ability to resist denting or cracking and depends on the strength and stiffness of the striking portion of the bat. An attempt to increase the durability of the bat often produces an adverse effect on the bat's performance, as by possibly increasing its overall weight and stiffness, or having less than optimum weight distribution.

It has been discovered that a hitter often can increase bat speed by using a lighter bat, thereby increasing the force transferred to the ball upon impact. Thus it would be advantageous to provide a bat having a striking portion which has sufficient durability to withstand repeated hitting, yet which has a reduced overall bat weight to permit increased bat speed through use of an overall lighter weight bat.

It also has been discovered that greater hitting, or slugging, capability may be obtained by providing a bat with a handle made of a material different from the material of the striking portion or formed in such a manner as to have different capabilities. One manner for providing such is to produce a bat with a composite handle, wherein the composite material may be structured to provide selected degrees of flexibility, stiffness, and strength. For example, in one hitting situation it may be best to have a bat with a more flexible handle, whereas for other hitting situations it is advantageous to have a handle with greater stiffness.

An example of a prior attempt to provide a bat with a handle connected to a barrel section is shown in U.S. Pat. No. 5,593,158 entitled "Shock Attenuating Ball Bat." In this patent an attempt was made to produce a bat with handle and barrel member separated by an elastomeric isolation union for reducing shock (energy) transmission from the barrel to the handle, and, inherently from the handle to the barrel. Accordingly, such a design does not allow for maximum energy transfer from the handle to the barrel during hitting. As a result, the bat produces less energy transfer or impact energy to the ball due to the elastomeric interconnection between the handle and barrel.

Therefore there is a continuing need for a bat that provides the flexibility of a separate handle member and striking member and maximizes the energy transfer between the two members. A continuing need also exists for a ball bat that provides exceptional feel and control without negatively affecting slugging or hitting performance.

The present invention provides an improved bat with a striking portion with good durability and striking capabilities and a handle portion with desirable weight and stiffness characteristics to permit greater bat speed during hitting.

One embodiment of the invention provides a bat having an elongate tubular striking member with a juncture section which converges inwardly toward the longitudinal axis of the bat on progressing toward an end of the striking member, and an elongate handle member having an end portion thereof which is firmly joined to the converging end portion of the striking member to provide a rigid interconnection therebetween to permit substantially complete striking energy transfer between the handle member and the striking member.

In another embodiment, the bat has an elongate tubular striking member having a juncture section adjacent its proximal end, the striking member being composed of metal having a first effective mass, and an elongate handle member composed of a material having a second effective mass which is less than the first effective mass of the striking member, the handle member having a juncture section adjacent its distal end, with the juncture sections of the striking member and handle member overlapping and being joined together to provide a rigid interconnection therebetween to permit substantially complete striking energy transfer between the striking member and the handle member on hitting. Because the handle member is of a lower effective mass it will help to produce a lighter weight bat with the possibility of a greater swing speed.

The present invention provides a novel bat and method for producing the same wherein the striking portion is comprised of the most appropriate, or optimum, structure for striking and the handle is comprised of the most appropriate, or optimum, structure for swinging, and the two are joined for optimum slugging capability.

The present invention provides a bat, and method for making a bat, wherein selected materials are used in selected portions of the bat to achieve proper weight, or mass, distribution for optimum swing speed and to provide desired strength, stiffness and damping of selected portions.

According to a principal aspect of a preferred form of the invention, a bat has a longitudinal axis and an overall first length, and is capable of being tested with a three-point bend stiffness test device having first and second supports. The bat includes an elongate tubular striking member and a separate handle member. The striking member has a distal end, a proximal end, and a striking region intermediate the distal and proximal ends. The handle member has a distal end and a proximal end, and is coupled to the striking member. The handle member has a resistance to bending along the longitudinal axis of the bat in the range of 10-1000 lbs/in a three-point bend stiffness test wherein the handle member is transversely supported in a first direction by the first and second supports spaced apart a selected distance, with the first support adjacent the distal end and the second support adjacent the proximal end, and the handle member is transversely loaded in a second direction, opposite the first direction, at a location on the handle member in a region between 30% and 40% of the selected distance from the distal end of the handle member.

According to another principal aspect of the present invention, a bat has a longitudinal axis, and is capable of being tested with a three-point bend stiffness test device having first and second supports. The bat includes a non-wooden, one-piece bat frame. The frame includes a distal end, a proximal end, an elongate tubular striking portion, and a handle portion. Either the handle portion or the striking portion includes a tapered region. The frame has a resistance to bending along the longitudinal axis in the range of 10-950 lbs/in a three-point bend stiffness test wherein the frame is transversely supported in a first direction by the first and second supports, wherein the first support is positioned at a first predetermined position, wherein the first predetermined position being the location where the tapered region has a first predetermined outer diameter, wherein the second support positioned a first predetermined distance from the first predetermined position, and wherein the frame is transversely loaded in a second direction, opposite the first direction, on the handle member at a second predetermined position that is located on the handle portion a second predetermined distance from the first predetermined position. The second predetermined distance is between 30% and 40% of the first predetermined distance.

According to another principal aspect of the present invention, a method of categorizing a plurality ball bats includes the following steps. At least two distinct bat categories are created based upon at least one bat characteristic. The at least one bat characteristic includes either the resistance to bending of the frame of the bat or the resistance to bending of the handle portion of the frame of the bat. The method further includes determining the resistance to bending of one of the frame and the handle portion for the plurality of bats. The method also includes assigning one of the at least two categories to each of the plurality of bats based, at least in part, upon either the resistance to bending of the frame or the resistance to bending of the handle portion.

The present invention contemplates producing a handle member with multiple composite layers which are appropriately oriented and joined to provide a handle which has selected strength and stiffness. By providing a bat with a handle member made of composite material which may be laid up in multiple layers with selected orientation and strength, the handle member may be structured to provide selected degrees of strength, flexibility, and vibration transfer in an assembled bat. The present invention also contemplates producing a handle member of a thermoplastic material.

In one embodiment, one of the juncture sections of the striking member or the juncture section of the handle member has projections thereon which extend radially from remainder portions of the juncture section a distance substantially equal to the thickness of a desired layer of adhesive to join the striking member and handle member. Such projections firmly engage the facing surface of the other member and this, in conjunction with the adhesive applied between the two members, provides a firm interconnection therebetween.

According to another principal aspect of the present invention, a bat is capable of being tested with a modal analysis test assembly having first and second supports assemblies. The bat includes an elongate tubular striking member and a separate handle member. The striking member has a distal end, a proximal end, and a striking region intermediate the distal and proximal ends. The handle member has a distal end and a proximal end. The handle member is coupled to the striking member, and is formed of a thermoplastic or fiber-reinforced thermoplastic material. The handle member has a damping ratio in the first bending mode of greater than or equal to 0.010 in a modal analysis test wherein the handle member is supported by the first support assembly adjacent the distal end of the handle member and the second support assembly adjacent the proximal end of the handle member. The bat is configured for organized, competitive play.

According to another principal aspect of the present invention, a bat capable of being tested with a modal analysis test assembly having first and second supports assemblies. The bat includes a non-wooden, one-piece bat frame. The bat frame includes a distal end, a proximal end, an elongate tubular striking portion and a handle portion. The handle portion includes a tapered region and the handle portion is formed of a thermoplastic or fiber-reinforced thermoplastic material, The handle portion has a damping ratio in the first bending mode of greater than or equal to 0.010 in a modal analysis test wherein the handle portion is cut away from the striking portion at a first location, and wherein the handle portion is supported by the first support assembly adjacent the proximal end of the bat frame and the second support assembly at the tapered region of the handle portion. The first location occurs where the tapered region of the handle portion has an outer diameter within the range of 1.9 to 2.25 inches. The bat is configured for organized, competitive play.

According to another principal aspect of the present invention, a bat is capable of being tested with a modal analysis test assembly having first and second supports assemblies. The bat includes an elongate tubular striking member and a separate handle member. The striking member has a distal end, a proximal end, and a striking region intermediate the distal and proximal ends. The handle member has a distal end and a proximal end. The handle member is coupled to the striking member. The handle member has first and second damping ratios in the first and second bending modes, respectively, of greater than or equal to 0.020 in a modal analysis test wherein the handle member is supported by the first support assembly adjacent the distal end of the handle member and the second support assembly adjacent the proximal end of the handle member. The handle member also has a first bending mode frequency of greater than or equal to 100 Hz and less than or equal to 280, and a second bending mode frequency of greater than or equal to 450 and less than or equal to 1000 Hz. The handle member has a resistance to bending along a longitudinal axis in the range of 10-850 lbs/in a three-point bend stiffness test wherein the handle member is transversely supported in a first direction by the first and second supports spaced apart a selected distance. The first support is positioned adjacent the distal end of the handle member and the second support is positioned adjacent the proximal end of the handle member, and the handle member is transversely loaded in a second direction, opposite the first direction, at a location on the handle member in a region between 30% and 40% of the selected distance from the distal end of the handle member. The bat is configured for organized, competitive play.

This invention will become more fully understood from the following detailed description, taken in conjunction with the accompanying drawings described herein below, and wherein like reference numerals refer to like parts.

BRIEF DESCRIPTION OF THE DRAWINGS

FIG. 1 is a sectional view through the longitudinal center of a bat in accordance with one embodiment of the invention.

FIG. 2 is a magnified sectional view of a juncture section of the bat of FIG. 1.

FIGS. 7-9 are perspective views of a flared end portion of the handle with forming members associated therewith during the production of the handle member to produce projecting ribs on the juncture section of the handle.

DETAILED DESCRIPTION

Figure 3:
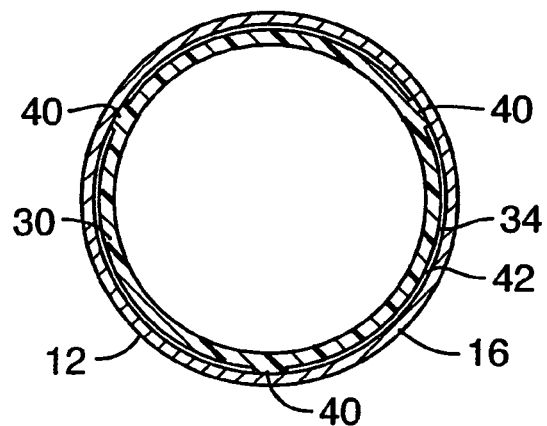
FIG. 3 is a cross sectional view taken generally along the line 3-3 in FIG. 2.

Referring to FIG. 1, an elongate tubular ball bat 10 having a longitudinal axis, or centerline, 20 comprises an elongate tubular striking member 12. The striking member has a proximal, or inner, end 12a and a distal, or outer, end 12b. A striking region 14 is disposed intermediate ends 12a, 12b. A frusto-conical juncture section 16 of the striking member adjacent end 12a converges toward centerline 20 on progressing toward end 12a.

In the embodiment illustrated in FIGS. 1 and 2 striking region 14 has a substantially cylindrical inner cavity, with an inner diameter $D_1$. A cylindrical tubular insert 22 is received in the striking region cavity to form a multiple-wall bat. The insert has proximal, or inner, and distal, or outer, ends 22a, 22b, respectively. End 22a is disposed adjacent juncture section 16. The bat also could be made as a single-wall bat without insert 22.

Juncture section 16 has a major diameter equal to $D_1$ and a minor diameter noted $D_2$ at its end 12a.

An elongate tubular handle member 30 is secured to and projects longitudinally outwardly from end 12a and juncture section 16 of the striking member.

The assembled bat 10 has an overall length $L_1$. Striking member 12 has a length $L_2$ and handle member 30 has a length $L_3$. As seen lengths $L_2$ and $L_3$ are each substantially less than $L_1$.

The handle member 30 in the illustrated embodiment may be made of a composite material or other appropriate material as will be discussed in greater detail below. It has opposed distal, or outer, end 30a, and proximal, or inner, end 30b. The handle member has an elongate, hollow, tubular, substantially cylindrical gripping portion 32 of a diameter $D_3$ throughout a major portion of its length, and a frusto-conical juncture section 34 adjacent end 30a. As best seen in FIGS. 1 and 2, juncture section 34 diverges outwardly from the longitudinal axis in a configuration complementary to the converging portion of juncture section 16 of the striking member. Juncture section 34 has a minor diameter $D_3$ (less than $D_2$), a major diameter $D_4$ (greater than $D_2$, but less than $D_1$), and a length which is no greater than 25% of the overall length $L_1$ of the assembled bat.

End 12a of striking member 12 provides an opening with a diameter $D_2$ greater than diameter $D_3$ of gripping portion 32 of handle member 30. The diverging portion of juncture section 34 of the handle member is such that the outer surface of juncture section 34 is substantially complementary to the configuration of the inner surface of juncture section 16 of the striking member so that they may fit in close contact with each other when assembled as illustrated in FIGS. 1 and 2.

Figure 4:
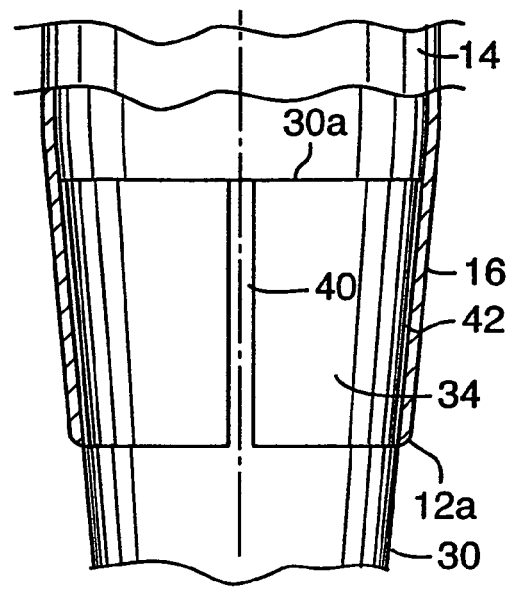
FIG. 4 is a view taken generally along the line 4-4 in FIG. 2, with a portion of the striking member broken away.

Referring to FIGS. 3 and 4, it will be seen that juncture section 34 of the handle member in the illustrated embodiment has a plurality of elongate, radially extending ribs, or projections, 40 on its outer surface. These ribs extend substantially longitudinally of the handle member, and are spaced apart circumferentially substantially equally about juncture section 34, or at approximately 120 from each other as illustrated.

Projections, or ribs, 40 extend outwardly from remainder portions of the juncture section of the handle member a distance substantially equal to the thickness of a layer of adhesive which it is desired to apply between juncture section 16 of the striking member and juncture section 34 of the handle member to secure these two members together to form the completed bat. It has been found desirable to apply a layer of adhesive between the juncture sections of the handle member and the striking member, which is in a range of 0.001 to 0.010 inch thick, and preferably within a range of 0.002 to 0.005 inch thick. Thus ribs 40 project outwardly from remainder portions of juncture section 34 a distance in a range of 0.001 to 0.010 inch and more preferably in a range of 0.002 to 0.005 inch.

When assembled as illustrated in the drawings, the outer surfaces of projections 40 firmly engage the inner surface of juncture section 16 of the striking member, with a layer of adhesive filling the space between the circumferentially spaced ribs, or projections, to adhesively join the striking member to the handle member in this juncture section. A layer of such adhesive is indicated generally at 42.

Although projections 40 are shown as formed on the handle, it should be recognized that projections formed on the inner surface of the juncture section of the striking member and extending radially inwardly from remainder portions of the striking member could be used also.

Figure 5:
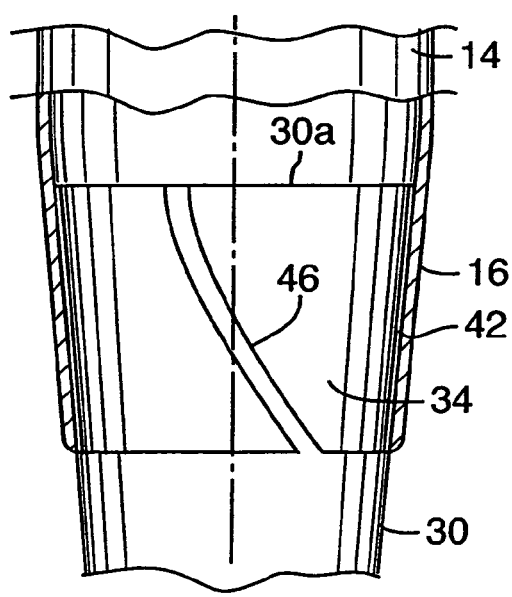
FIG. 5 is a view similar to FIG. 4, but with a different rib configuration.

FIG. 4 illustrates an embodiment of the invention in which the ribs 40 are substantially straight, and extend longitudinally of the handle member. FIG. 5 illustrates another embodiment in which the ribs 46 are curved, such that they extend somewhat helically about the outer surface of juncture section 34. They function similarly to ribs 40.

Although the projections, which may be formed on the external surface of the juncture section of the handle or on the internal surface of the juncture section of the striking member, have been illustrated and described generally as elongate ribs, it should be recognized that the purpose of such projections is to provide a firm contacting engagement between the juncture section portions of the handle member and striking member to produce a substantially rigid interconnection therebetween. Thus, the projections do not necessarily have to be elongate ribs as illustrated. Instead, there could be a plurality of projections of substantially any shape extending outwardly from remainder portions of the juncture section of the handle member or projecting inwardly from the inner surface of the juncture section of the striking member, or any combination thereof, such that firm interengagement is provided between the striking member and the handle member. For example the projections may be a pebbled surface configuration, crisscrossed ribs, irregularly shaped ribs, or any other configuration that provides a plurality of raised surfaces for direct contact with the other member to provide a substantially rigid interconnection between the handle member and the striking member.

The complementary converging and diverging configurations of the juncture sections of the striking member and handle member prevent the two parts from being pulled apart longitudinally in opposite directions, such as by pulling outwardly on opposite ends of the bat. The adhesive is provided to inhibit longitudinal movement of the handle member and striking member upon application of forces there against such as might occur if forces were exerted at opposite ends of the bat in an attempt to compress them toward each other.

Although adhesive has been noted as a means for securing the two members against relative longitudinal movement in the one direction, it should be recognized that other means could be used also. For example, mechanical locking means of various types could be employed. Although not shown herein, the striking member or handle member could be formed with a radially projecting lip which engages a portion on the other member when the parts are moved into the positions illustrated in FIGS. 1-4 to prevent longitudinal separation of the members.

Further, although it has been mentioned that adhesive can fill the spaces between the projections, it is not necessary that the spaces between the projections always be filled, and a less than filling quantity of adhesive may be adequate.

When assembled as illustrated in the drawings, juncture section 34 of the handle member fits tightly within juncture section 16 of the striking member and a layer of adhesive interposed therebetween rigidly interconnects the striking member and handle member.

In a particularly preferred embodiment, the striking member 12 is a one-piece integrally formed generally tubular member, and the handle member 30 is a one-piece integrally formed tubular unit. The striking and handle members 12 and 30 are preferably coupled together through a direct connection to each other such that at least a portion of the striking member 12 directly contacts at least a portion of the handle member 30. A non-metallic substance (an adhesive) is also preferably disposed between the handle and striking members 12 and 30 to further secure the connection between the handle and striking members.

In other alternative preferred embodiments, the handle and striking members can be coupled together in a manner that prevents direct contact between the handle and striking members. In such alternative preferred embodiments, a non-metallic substance can be used to couple the handle member to the striking member. The non-metallic substance can be an adhesive, an elastomer, an epoxy, a chemical bonding agent or combinations thereof. In other alternative preferred embodiments, other types of conventional fastening or coupling means, such as, for example, metallic fasteners, one or more metallic or non-metallic tubular coupling members and one or more rings, can be used to couple the handle and striking members. Further, because direct contact between the handle and striking members is not necessarily present in these alternative preferred embodiments, the juncture sections each of the handle and striking members can be formed with or without ribs or other projections.

The fully assembled bat as shown in FIG. 1 includes a knob 48 secured to the proximal end 30b of the handle member and a plug 50 inserted in and closing the distal end 12b of the striking member. Referring to FIG. 1, a weighted member, or plug, 54 is inserted and secured in the proximal end portion of handle member 30. The structure and function of member 54 will be described in greater detail below.

A generally cylindrical transition sleeve 52 having a somewhat wedge-shaped cross section as illustrated in FIG. 2 is secured to handle member 30 to abut end 12a of the striking member to produce a smooth transition between end 12a of the striking member and the outer surface of handle member 30. Rather than applying a transition sleeve 52, the proximal end 12a of juncture section 16 of the striking member may be swaged to a gradually thinner edge region with a rounded proximal edge.

Describing a method by which the bat illustrated in the figures may be produced, striking member 14 is formed of a material and in a manner to provide desired impact, or striking capabilities. The striking member may be formed by swaging from aluminum tube (or other metal found appropriate for the striking region of a bat) to yield an integral weld-free member. While swaging is one means of producing such striking member, it should be understood that other methods of manufacturing might work equally as well.

The striking member is formed with a circular cross section having a striking region which has a cylindrical interior surface defining an interior cavity of a first selected cross sectional dimension, or diameter, $D_1$. This produces a striking member having a first effective mass. The effective mass may be a function of the specific gravity of the material, size, thickness, or other characteristics.

The juncture section 16 converges inwardly toward longitudinal axis 20 to an opening at end 12a having an internal diameter indicated $D_2$ which is less than $D_1$.

Insert 22 has an outer diameter corresponding generally to, but possibly slightly smaller than, $D_1$ such that it may be inserted into the striking portion 14 of striking member 12. Its proximal, or inner, end 22a may engage the beginning of the inward converging portion of juncture section 16 which prevents the insert from shifting further toward end 12a of the striking member. End 12b of the striking member 12 is bent over to form a circular lip with a bore extending therethrough. An end plug 50 is placed in the end of the bat to engage end 22b of the insert to hold it in place.

The striking member 12 may be formed of tubular metal material of a first specific gravity, which may be, but is not limited to, aluminum, steel, titanium, or other suitable metal material. The striking member also might be formed of composite or other suitable materials. Insert 22 also may be made of any such tubular metal or a composite. The insert serves a function as set out in prior U.S. Pat. Nos. 5,415,398 and 6,251,034. Since the striking member is formed separately from the handle member, the striking member may be formed in such a manner and from such materials as to produce the desired, or optimum, impact, or striking capabilities. Thus the requirements of the striking member and handle member are decoupled permitting each to be made of such materials and in such a manner as to provide optimum point location of mass in the bat and optimum strength and stiffness or flexibility where needed.

The handle member may be formed from material, which produces a different, and generally a lower, effective mass than it would have if composed in a manner or of a material similar to that from which the striking member is formed. The different effective mass of the handle member may be a function of the specific gravity of the material forming the striking member, its size, thickness or other characteristics. For example the material of the handle member may have a different specific gravity than the material from which the striking member is formed. In one preferred embodiment, the handle member is formed of a thermoplastic material, a fiber reinforced thermoplastic and combinations thereof. Some examples of thermoplastic materials include nylon, urethane, ABS, polyvinylchloride and combinations thereof. The fiber reinforced thermoplastic material can include fibers formed of fiberglass, aramid, carbon, Kevlar®, high molecular weight polyethylene in strand form, or other conventional fiber materials.

In some instances the handle member may be formed of a composite material, such as carbon fiber, having a second specific gravity less than the first specific gravity of the striking member. In other instances the handle member may be formed of materials or in such a manner as to provide one or more operational or functional characteristics which differ from those which the handle member would have if merely formed in the same manner of the same material as the striking member. For example the handle may be formed from other materials such as titanium, aluminum, plastic or other appropriate material.

Figure 6:
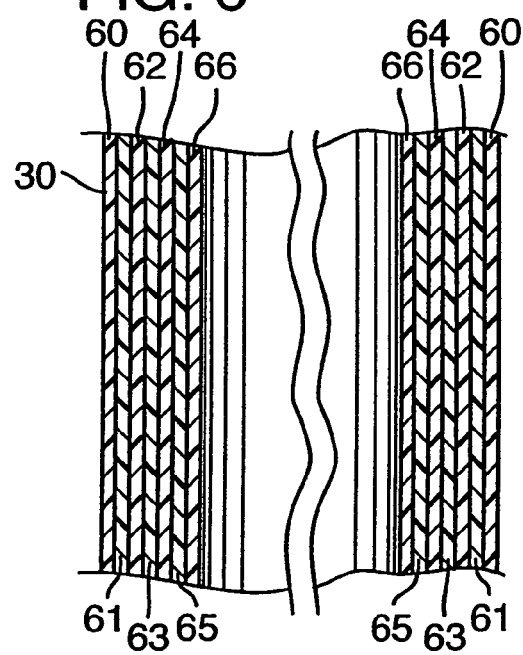
FIG. 6 is a magnified sectional view of a portion of the handle taken generally along the line 6-6 in FIG. 2.

Referring to FIG. 6, in one embodiment the handle member includes multiple tubular composite layers as indicated generally at 60-66. The layers 60-66 are disposed adjacent each other and are arranged in a substantially concentric manner. The number of layers must be sufficient to withstand the swinging action of the bat, a gripping force applied thereto by a user, and the bending force imposed thereon when striking with the bat. However, preferably only the number of layers necessary to withstand such stresses would be provided, since more layers will add additional weight to the handle member. The number, position, and orientation of the multiple layers will vary depending upon the size and type of bat used. In one embodiment, the handle member may include the seven layers, 60-66, as shown. The number and thickness of layers and their position, and orientation may vary as needed to provide desired flexibility or stiffness and to withstand gripping forces and hitting stresses.

Each composite layer in the embodiment illustrated includes structural material to provide structural stability and matrix material to support the structural material. The structural material may be a series of fibers supported within the matrix material. In one preferred embodiment, most of the layers include fibers that preferably extend substantially longitudinally of the handle member. When the bat strikes a ball, the greatest stress component on the handle member may be in bending, thus the majority of the fibers preferably are directed longitudinally to withstand these stresses. For example, the even numbered layers 60, 62, 64, 66 may be longitudinally extending layers, whereas odd numbered layers 61, 63, 65, which are fewer in number, may be circumferentially disposed layers. The longitudinally extending layers often are referred to as longitudinal, or 0 layers, since they have fibers that are directed substantially parallel to the longitudinal axis. The other layers may be what are termed 90 layers, or circumferential layers, since they have fibers, in which the majority thereof is directed at substantially 90 relative to the longitudinal axis. Specific layers may be constructed with fibers directed at substantially 90 relative to the longitudinal axis and other fibers directed at substantially 0 and woven together within each layer. Or the layers may be uni-directional layers wherein the fibers within the layers are parallel.

In another preferred embodiment, one or more of the multiple tubular composite layers 60-66 can formed primarily of fibers extending in a non-longitudinal direction, with only a small percentage, or none, of the fibers extending in a longitudinal direction. In this preferred embodiment, the fibers can be laid substantially 90 from the longitudinal axis, in various angled positions between 1-89, or in combinations thereof. By having a small percentage, or none, of the fibers extending at 0 (longitudinally), the stiffness of the handle can be reduced and optimized to fit a particular application. In another alternative preferred embodiment, one or more of the multiple composite layers can be formed of fibers, or fiber segments, in a random, or generally uniformly, configuration.

In this embodiment, the layers include carbon fibers. However the fibers could be other type of known fiber material, such as, but not limited to, Kevlar™, boron, aramid, fiberglass, or high molecular weight polyethylene in strand form. A metallic mesh also might be used.

The matrix in the layers preferably is sufficiently durable and has sufficiently high adhesion properties to continue supporting the structural material even after repeated use. In a preferred embodiment, the matrix material is a toughened epoxy. Alternatively, the matrix can be some other thermally setting resin such as a polyester or vinyl ester. A person skilled in the art will appreciate that a thermoplastic resin can be used, rather than a thermally setting resin.

In particularly preferred embodiments, the handle member 30 has a weight of about 158 grams and is formed with the number of layers between 28 to 40, wherein the weight of each layer varies from 0.6 to 14.0 grams. At least one layer of such embodiments is a braided layer having a percentage of the fibers within the braided layer extending longitudinally and the remaining fibers of the braided layer extending substantially circumferentially. Also, from 1 to 4 layers are formed with non-woven or non-braided fibers extending in two separate directions, such as, for example, 0 degrees and 90 degrees.

Additionally, in particularly preferred embodiments, the handle member 30 includes between 2 and 10 layers having longitudinally extending fibers. In particularly preferred embodiments, the handle member 30 includes a plurality of layers having helically extending fibers at various angles relative to the longitudinal axis, such as, for example, between 10 and 16 layers extend at plus or minus 30 degrees from the longitudinal axis, between 6 and 16 layers extend at plus or minus 45 degrees from the longitudinal axis, and 2 or less layers extend at plus or minus 60 degrees from the longitudinal axis.

Also, in particularly preferred embodiments, between 3 and 24 layers are formed of carbon fibers and between 13 and 25 layers are formed of fiberglass fibers. The layers are formed in a variety of different lengths varying from 5 cm to 67 cm. The layers, which are less than 67 cm, are placed at varying positions along the full length of the handle member. The layers are also formed in a variety of different widths ranging between 3.3 and 17.5 cm. Other layers have widths that vary along their length from between 0 to 17.5 cm. The number of layers having widths that vary along their length range between 8 and 11 layers. The fibers within layers are formed with an area fiber density of between 0.0143 and 0.048 grams/cm$^2$, and each layer can be formed with a weight in a range of 0.6 to 14 grams.

In alternative preferred embodiments, one or more of the characteristics of the handle member can be altered, such as, for example: the weight, size, thickness and stiffness of the handle member; the number, size, composition and orientation of the layers; and the composition, density, and orientation of the fibers within a layer. The handle member preferably has a weight within a range of 3 to 8 ounces. The handle member 30 can be formed without a braided layer or with an alternate number of braided layers. The handle member 30 can be formed with five or more layers of fibers wherein the non-woven fibers extend in two directions or with no such layers. Two or more of the layers can include other combinations of longitudinally, circumferentially and helically extending fibers. The handle member can be formed of multiple layers having helically extending fibers wherein any one layer can have fibers extending between plus or minus 1 to 89 degrees from the longitudinal axis. The fibers within the layers can be formed of other materials, such as, for example, glass, boron, graphite or other metal.

Figure 10:
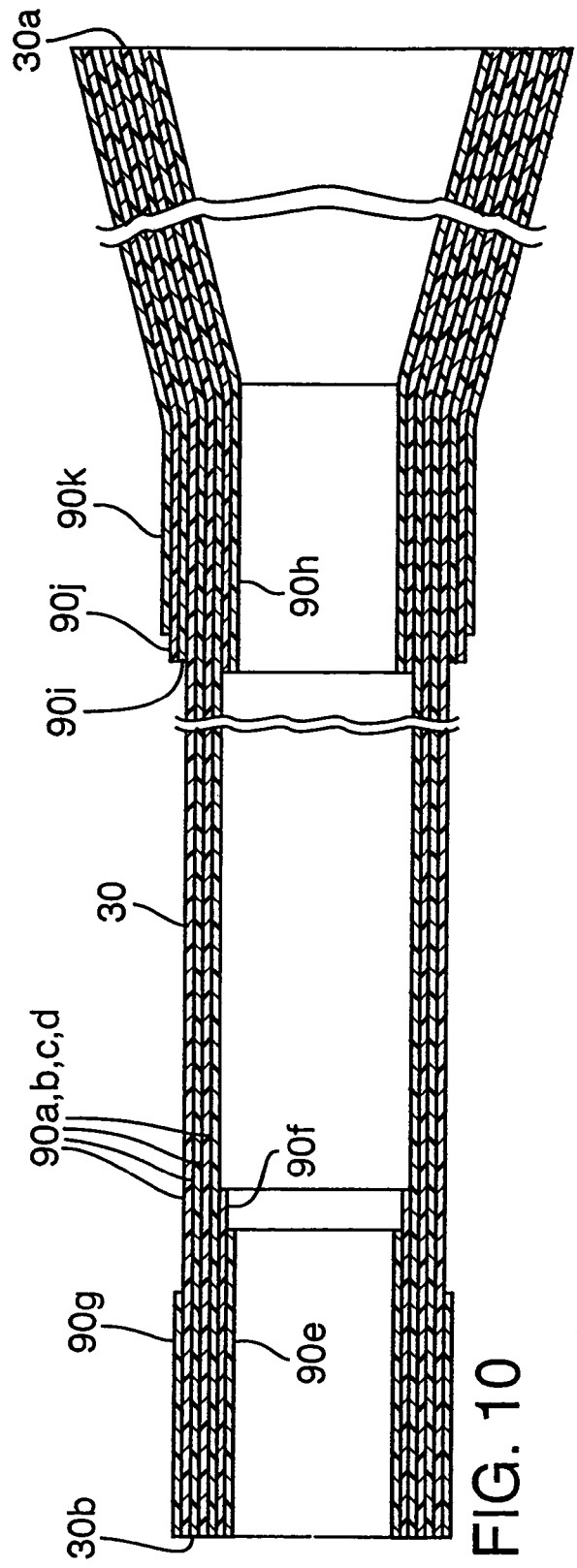
FIG. 10 is an enlarged longitudinal cross section of a handle member as may be used in the bat of FIG. 1, with portions broken away to illustrate composite lay up of the handle member with multiple composite material layers disposed at various regions along the length of the handle and with some sections of the handle having more layers than others and being composed of different materials to obtain selected handle member mass, strength and stiffness characteristics.

FIG. 10 is a simplified illustration of the manner in which multiple layers of fiber composite material may be assembled. As is shown some of the layers extend the full length of the handle (layers 90 *a, b, c, d*), while others are shorter and reside in selected regions of the handle member (90 *e, f, g, h, i, j, k*). Only a limited number of layers are shown in FIG. 10, for the sake of simplicity in the illustration.

The handle member includes a proximal gripping portion and a distal tapered portion, wherein one of the proximal gripping portion and the distal tapered portion is formed with a larger number of layers than the remaining portion. The characteristics of the handle member therefore can vary over its length.

The handle member 30, when formed of a composite material and produced in accordance with the present invention, can be produced with a stiffness, or resistance to bending along the longitudinal axis 20 of the bat 10, within the range of 10 to 1980 lbs/in. when measured using a test method described below. In one preferred embodiment, the handle member 30 is formed with a stiffness or resistance to bending within the range of 400-900 lbs/in. (The term "lbs/in." refers to the amount of force in pounds applied perpendicular to the member to produce on inch of deflection in a test method described below.)

In other alternative preferred embodiments, the handle member 30 is formed with a stiffness, or resistance to bending along the longitudinal axis 20 of the bat 10, at specific levels within the range of 10 to 1980 lbs/in. The inventors of the present invention have discovered that, contrary to conventional bat design and construction, when the handle member 30 of the bat 10 is configured with a low stiffness, or resistance to bending along a longitudinal axis of the bat, the feel and perceived performance of the bat 10 significantly improves without negatively affecting the reliability of the bat. The present invention contemplates multiple preferred embodiments of ball bats in which the stiffness, or a resistance to bending along the longitudinal axis of the bat, of the handle member 30 is significantly lower than conventional bats. While conventional bat design focuses on bats having a resistance to bending typically far above 1000 lbs/in. (often 2200-2500 lbs/in for conventional metallic bats), in order to prevent the bat from becoming "too whippy," the present invention incorporates ball bats having handle members with significantly lower stiffness values (resistance to bending along the longitudinal axis of the bat), which are then tuned or optimized to maximize the feel and performance of the ball bat for a particular user.

Conventional performance bat design seeks to obtain a stiff handle member or portion to be used in conjunction with a responsive striking member or portion. A responsive striking member or portion provides the desired trampoline effect upon impact with a ball, and a stiff handle member maximizes the mass and the force that can be applied or transferred to the ball upon impact with the striking member or portion. A stiffer handle member or portion is also desired under conventional bat design because it allows the batter to bring the head of the bat around for impact faster and in a more controlled manner.

Contrary to conventional performance bat design, the inventors of the present invention have discovered that producing a handle member, or portion, of a bat with a significantly lower resistance to bending in a longitudinal direction along the bat, provides the bat with a significantly improved feel to the user, particularly during off-center hits. Existing metallic and composite ball bats often provide painful stinging or harsh vibrational feedback through the handle member or handle portion of the bat to the user when the bat contacts the ball away from the "sweet spot" of the striking member. This effect is often heightened at lower temperatures. A bat having a handle member, or portion, with a very low resistance to bending in the longitudinal direction of the bat, however, significantly improves the feel of the bat by altering or reducing the size or configuration of the impact energy extending along the bat. The handle member or handle portion having the low resistance to bending tends to isolate, alter and/or reduce the painful, harsh vibrational energy generated in a bat from an off-center impact with a game ball.

Often, the harsh or painful sensation felt by a batter when impacting a ball can have a significant negative impact on the ball player, particularly younger or less skilled players who do not always contact the ball at the sweet spot of the striking member or portion. Many players consciously, or subconsciously, alter or reduce the speed, motion or fluidity of their swing in an effort to avoid experiencing the stinging or harsh vibrational energy that can be generated upon impact with a ball. The handle member or handle portion, having a significantly reduced resistance to bending, alters, dampens, separates, isolates and/or reduces this negative vibrational energy or sensation transmitted to the ball player, particularly during mis-hits. After repeated use of such bats having a handle member or portion with a significantly lower resistance to bending, the ball player experiences the improved feel provided by the bat, particularly during mis-hits. The player typically will become more aggressive at the plate, swinging freer, smoother and often faster, thereby often improving his or her performance, even when mis-hitting the ball. Further, more skilled batters may be able to adjust their swings to maximize the impact of the significantly more flexible handle members. More skilled players potentially can bring the barrel or striking portion of the bat around into the point of impact with a ball in a manner that takes advantage of the flexibility of the handle to produce potentially greater bat head or striking portion speed.

By lowering the resistance to bending of the handle member 30 well beyond the level of conventional bats, the present invention creates a significantly broader range of bat configurations and provides the ability to properly match a bat to a ball player. Other factors such as the player's size, age, strength, skill level and swing speed, as well as the type of ball game being played can be used along with the resistance to bending of the handle member to select a ball bat that is best suited for an individual player. The present invention includes a large number of bat configurations having resistance to bending levels that are significantly lower than conventional bats. In one particularly preferred embodiment, the handle member has a resistance to bending along the longitudinal axis within the range of 900-1000 lbs/in. In another particularly preferred embodiment, the handle member has a resistance to bending along the longitudinal axis within the range of 800-900 lbs/in. In another particularly preferred embodiment, the handle member has a resistance to bending along the longitudinal axis within the range of 700-800 lbs/in. In other particularly preferred embodiments, the handle member can have a resistance to bending along the longitudinal axis within the ranges of 600-700 lbs/in., 500-600 lbs/in., 400-500 lbs/in., 300-400 lbs/in., 200-300 lbs/in., 100-200 lbs/in., 10-100 lbs/in., or combinations and variations of these ranges. Each one of these ranges, or variations of these ranges, can be used to provide a bat having a resistance to bending that is best suited for a particular ball player for a particular type of ball game. Each of these ranges or range variations can be used to produce an optimal bat for a particular type of ball player for a particular application.

Figure 11:
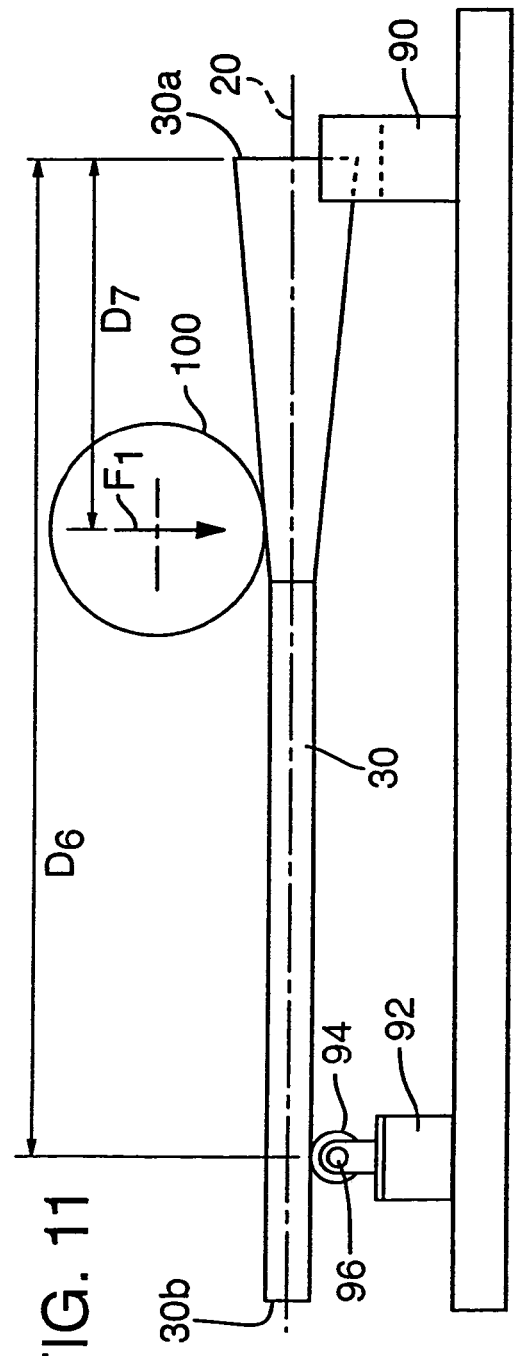
FIG. 11 is a side elevation view of a test fixture for testing the bending strength of a handle member with an exemplary handle member mounted therein for testing.

Referring to FIG. 11, the stiffness of the handle member 30 is determined through a three-point bend stiffness test wherein the handle member is placed upon first and second supports 90 and 92 of a universal test machine, or similar test machine, such as the universal test machine produced by Tinius Olsen Testing Machine Co., Inc. of Willow Grove, Penn. The first support 90 is a V-block support positioned at the distal end 30a of the handle member 30. The V-block support configuration of the first support 90 also serves to inhibit both longitudinal and transverse movement of the distal end 30a of the handle member 30. The second support 92 is a roller support including a roller 94 rotatable about a horizontal axis 96 spaced from V-block support 90 and positioned near the proximal end 30b of the handle member 30. For handle members 30 greater than or equal to 19 inches, the second support 92 is positioned a distance $D_6$ of 19 inches from support 90. The second support 92 also supports the handle member 30 in a first direction, preferably by maintaining the proximal end such that the longitudinal axis 20 of the bat 10 is in a substantially horizontal position. The second support 92 enables the proximal end 30b to move longitudinally.

The third point of the bend stiffness test is provided by a crosshead 100, preferably having a semi-circular or circular shape. Most preferably, the semi-circular crosshead has a radius of 2.0 inches. The crosshead is configured to extend in a second direction opposite of the first direction. The crosshead may be moved downwardly onto the horizontally positioned handle member 30 with a force noted $F_1$ imposed thereon. The crosshead is connected to a load cell (not shown) which includes a strain gauge for measuring the load applied to the crosshead during displacement of the crosshead. The crosshead 100 is positioned a distance $D_7$ from the first support 90. Distance $D_7$ is in a range of 30% to 40% of distance $D_6$, and more preferably 7 inches, such that the semicircular crosshead contacts the handle member at a location approximately 7.0 inches from the distal end 30a of the handle member 30.

During testing, the handle member is positioned as described above. The crosshead is driven in the second direction at a speed of 1.0 inches per minute. As the crosshead moves in the second direction (i.e., downwardly in FIG. 12) the testing machine with input from the load cell calculates the load ($F_1$) per the lateral deflection, or displacement, of the handle member 30.

Table 1 below illustrates the resistance to bending along the longitudinal axis of a bat of handle members of an existing bat formed with separate striking and handle members, as well as handle members of bats formed under the present invention.

TABLE 1

RESISTANCE TO BENDING ALONG A LONGITUDINAL AXIS FOR HANDLE MEMBERS OF BATS HAVING SEPARATE HANDLE AND STRIKING MEMBERS

| Test | | Resistance to Bending (lbs/in) | | |
|---|---|---|---|---|
| Sample # | Sample Description | Test a | Test b | Average |
| ts04-050 | Easton ® Connexion ™/z-core titanium/−3 besr certified/ 34"/31 oz/mdl. bt7-z/baseball/ handle-barrel separated | 1559.20 | 1553.48 | 1556.34 |
| ts04-060-1 | DeMarini ® Sample No. 1 | 18.79 | 18.21 | 18.50 |
| ts04-060 | DeMarini ® Sample No. 2 | 25.94 | 24.97 | 25.45 |
| ts04-049 | DeMarini ® Sample No. 3 | 30.71 | 31.51 | 31.11 |
| ts04-049-1 | DeMarini ® Sample No. 4 | 36.71 | 38.82 | 37.77 |
| vxw | DeMarini ® Sample No. 5 | 557.81 | 593.91 | 575.86 |
| evo 1 | DeMarini ® Sample No. 6 | 609.03 | 627.56 | 618.30 |
| sf2 1 | DeMarini ® Sample No. 7 | 797.58 | 720.04 | 758.81 |
| handle-1 | DeMarini ® Sample No. 8 | 1589.56 | 1530.03 | 1559.80 |

Easton ® is a registered trademark of Jas. D. Easton, Inc. Connexion ™ is a trademark of Easton Sports, Inc.

The DeMarini® Samples 1-7 are examples of handle members of the present invention having resistance to bending values well below the handle members of existing bats, which are configured with separate striking and handle members. The handle members having the reduced resistance to bending values provide the ball player with a significantly improved feel and perceived performance. DeMarini Sample 1 has a resistance to bending value that is over 95% lower than the resistance to bending of the handle member of the existing Easton® Co nnexion™ bat model of Table 1.

Figure 13:
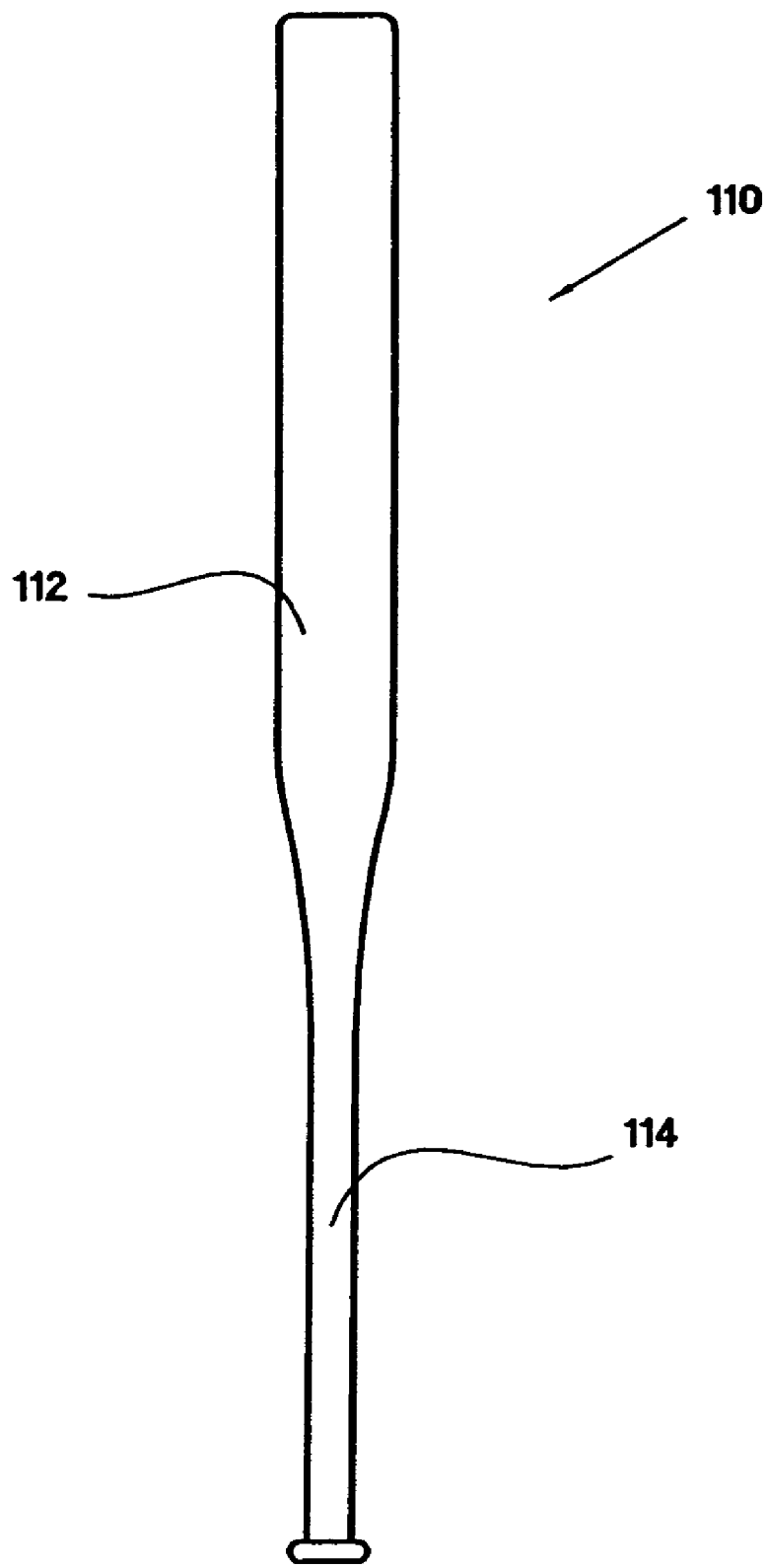
FIG. 13 is a side view of a bat having a one-piece integral frame.

The bat 10 of the present invention can be formed with separate striking and handle members 12 and 30 (see FIGS. 1-5) or as a bat 110 having an integral one-piece frame 110 as shown in FIG. 13. The frame 110 includes a striking portion 112 integrally connected with the handle portion 114. The frame 110 is formed of a strong, flexible material, preferably a composite material. Alternatively, other materials can be used, such as, for example, a tubular metal material or a combination of composite and metal materials. Through the use of composite materials throughout the frame 110, the frame 110 can be designed with different characteristics in the striking portion 112 compared to the handle portion 114. Preferably, the handle portion 114 is configured to be significantly more flexible than the striking portion 112.

Figure 12:
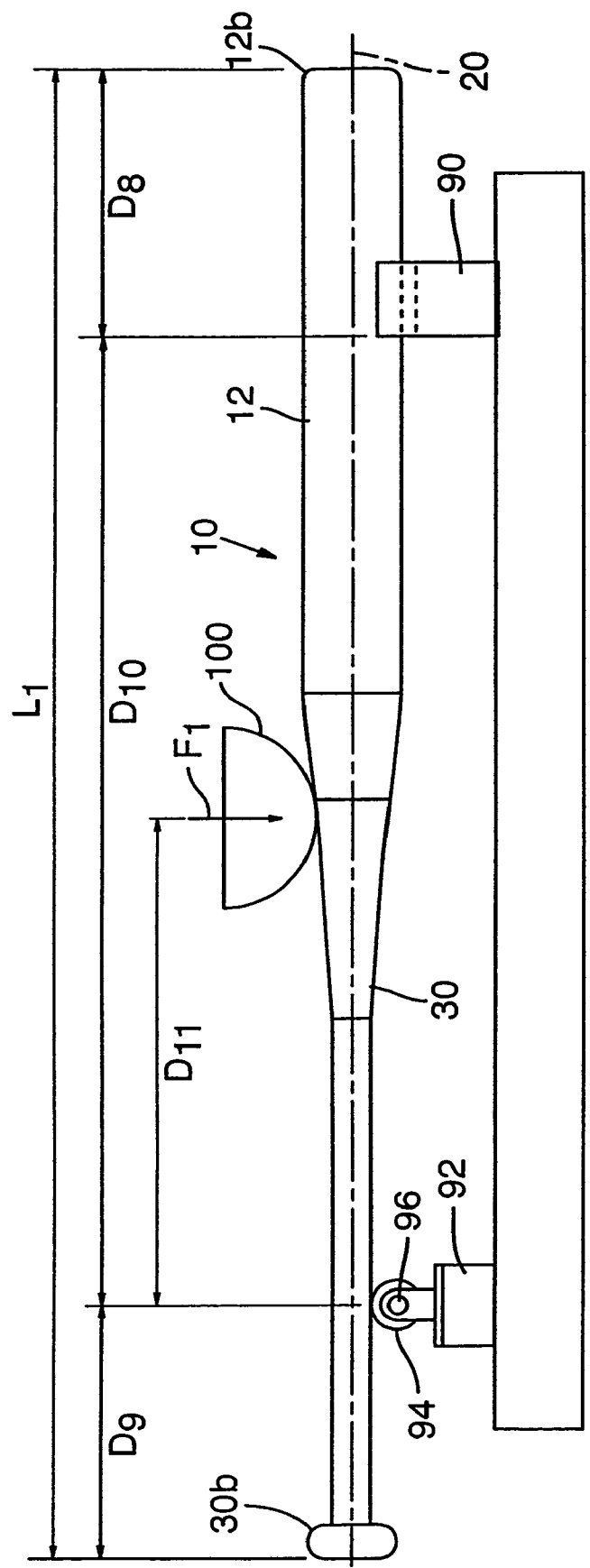
FIG. 12 is a side elevation view of a test fixture for testing the bending strength of a full length assembled bat with an exemplary handle member mounted therein for testing.

Referring to FIG. 12, one method of performing the three-point bend stiffness test on an assembled bat is illustrated. When testing a bat the first support 92 is positioned such that a proximal side of the first support lies a distance $D_8$, which may be approximately 6 inches, from the distal end 12b of the striking member 12, and the second support 92 is positioned a distance $D_9$, which may be approximately 6 inches, from the proximal end 30b of the handle member 30. The distance between supports 90, 92 is noted at $D_{10}$ and the cross head is positioned a distance $D_{10}$ from support 92, which is approximately one half $D_{10}$ so as to contact the bat at a point between and generally equidistant from the first and second supports.

During testing, the bat 10 is positioned as described above. The crosshead is driven in the second direction (downwardly in FIG. 12) at a speed of 0.5 inches per minute. As the crosshead moves in the second direction, the testing machine with input from the load cell calculates the load per displacement of the bat.

Figure 14:
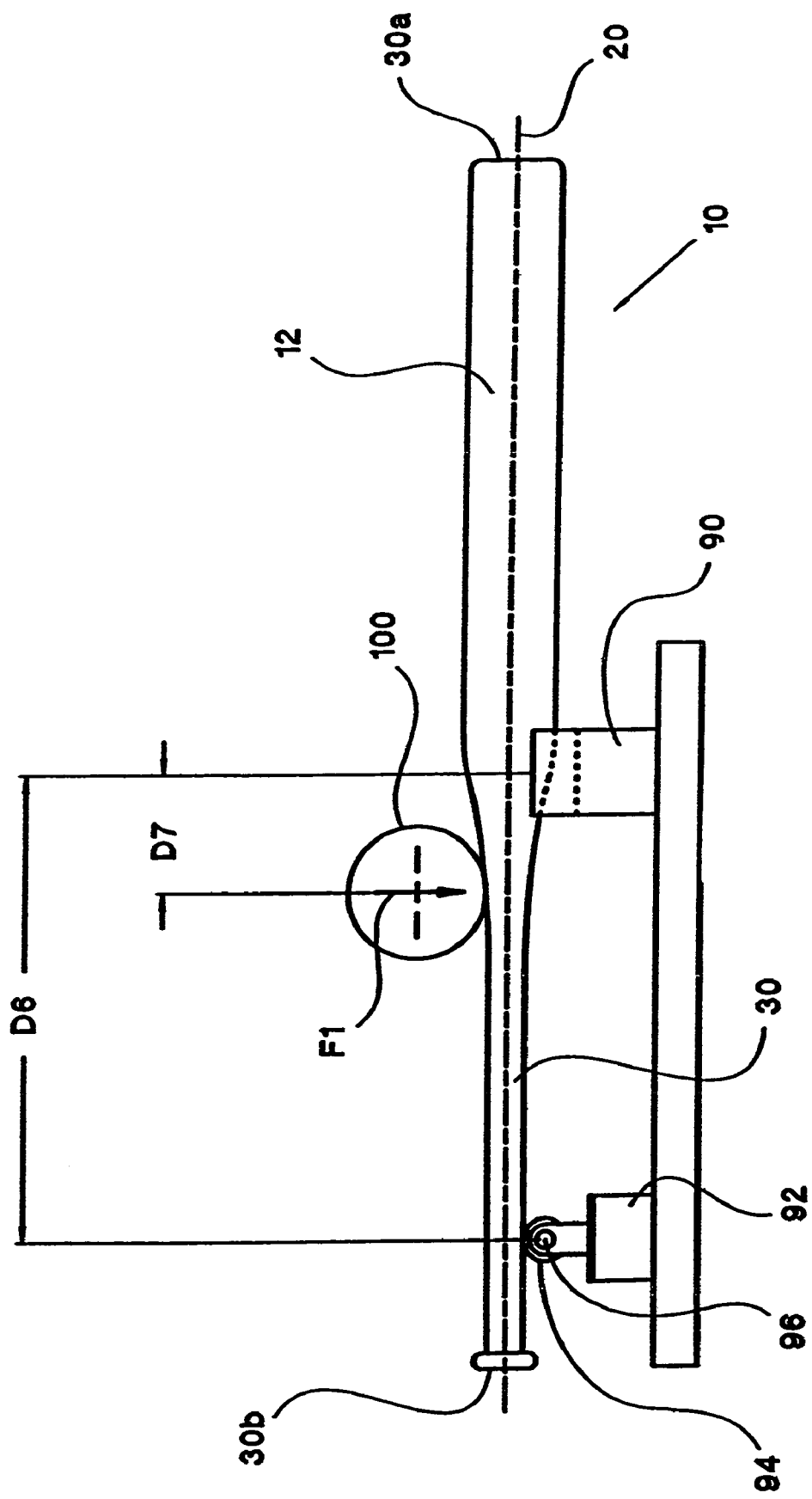
FIG. 14 is a side elevation view of a test fixture for testing the bending strength of a bat with an exemplary assembled bat, or a bat having a one-piece integral frame, mounted therein for testing.

Referring to FIG. 14, another method of performing the three-point bend stiffness test on an assembled bat is illustrated. The stiffness of the bat 10 (or 100) is determined through a three-point bend stiffness test wherein the handle member 30 (or handle portion 110) of the bat 10 (or bat 110) is placed upon the first and second supports 90 and 92 of the universal test machine, or similar test machine. The first support 90 is a V-block support positioned toward the distal end of the handle portion 30 of the bat 10 and at the tapered region of the bat 10 (the tapered region can be part of the handle portion, part of the striking portion or a combination of both portions). The tapered region of the bat 10 is measured to identify the location of a predetermined outside diameter of the bat 10. Preferably, an outside diameter of 2.1 inches is selected. Alternatively, an outside diameter within the range of 2.1 to 2.25 inches can be selected. The tapered region of the bat 10 is placed into the first support 90 at the location where the predetermined outside diameter (preferably 2.1 inches) occurs. The V-block support configuration of the first support 90 also serves to inhibit the transverse movement of the bat 10.

The second support 92 is spaced from the V-block support 90 and is positioned near the proximal end 30b of the handle member 30. The handle member or portion is then placed over the second support 92. The second support 92 is preferably positioned a distance $D_6$ of 19 inches from support 90. The second support 92 also supports the handle member 30 in a first direction, preferably by maintaining the proximal end such that the longitudinal axis 20 of the bat 10 is in a substantially horizontal position. The second support 92 enables the proximal end 30b to move longitudinally. If the bat 10 (or the bat 110) is configured such that the handle member 30 (or the handle portion 110) of the bat 10 (or the bat 110) does not extend to the second support 92, a different predetermined outside diameter value along the tapered region of the bat 10, or the handle member 30, can be selected. A diameter greater than 2.1 inches up to 2.25 inches can be used.

The third point of the bend stiffness test is provided by the crosshead 100. The crosshead is configured to extend in the second direction opposite of the first direction. The crosshead may be moved downwardly onto the horizontally positioned handle portion or handle member 30 with a force noted $F_1$ imposed thereon. The crosshead is connected to the load cell (not shown) which includes the strain gauge for measuring the load applied to the crosshead during displacement of the crosshead. The crosshead 100 is positioned a distance $D_7$ from the first support 90. Distance $D_7$ is in a range of 30% to 40% of distance $D_6$, and more preferably 7 inches, such that the semicircular crosshead contacts the handle member at a location approximately 7.0 inches from the location of the predetermined diameter (preferably 2.1 inches along the tapered region of the bat 10).

During testing, the handle member is positioned as described above. The crosshead is driven in the second direction at a speed of 1.0 inches per minute. As the crosshead moves in the second direction (i.e., downwardly in FIG. 13) the testing machine with input from the load cell calculates the load ($F_1$) per the lateral deflection, or displacement, of the handle member 30.

The bat of the present invention can be formed such that the stiffness of the bat 10 is within the range of 10 to 2500 lbs/in. In one particularly preferred embodiment, the bat 10 is formed with a stiffness, or resistance to bending, within the range of 10 to 850 lbs/in. In another preferred embodiment, the bat is formed with a resistance to bending within the range of 500 to 1500 lbs/in, and more preferably in a range of 400-900 lbs/in. A conventional aluminum bat typically has a stiffness, or resistance to bending, of approximately 2200 to 2500 lbs/in. In one particularly preferred embodiment, the bat is formed with a resistance to bending along the longitudinal axis within the range of 800-900 lbs/in. In another particularly preferred embodiment, the bat has a resistance to bending along the longitudinal axis within the range of 700-800 lbs/in. In other particularly preferred embodiments, the bat can have a resistance to bending along the longitudinal axis within the ranges of 600-700 lbs/in., 500-600 lbs/in., 400-500 lbs/in., 300-400 lbs/in., 200-300 lbs/in., 100-200 lbs/in., 10-100 lbs/in., or combinations and variations thereof. Each one of these ranges, or variations of these ranges, can be used to provide a bat having a resistance to bending that is best suited for a particular ball player for a particular type of ball game.

Table 2 provides a listing of the resistance to bending along the longitudinal axis 20 of a number of existing ball bats and a number of ball bats configured under the present invention, measured using the second full (assembled) bat test method described above. (The term "lbs/in." refers to the amount of force in pounds applied perpendicular to the bat to produce on inch of deflection in a test method described below.)

TABLE 2

RESISTANCE TO BENDING ALONG A LONGITUDINAL AXIS OF ASSEMBLED BATS

| Test Sample # | Sample Description | Resistance to Bending (lbs/in) | | |
|---|---|---|---|---|
| | | Test a | Test b | Average |
| ts04-032 | Easton ® Connexion ™/−3/33"/30 oz/baseball | 1413.79 | 1450.00 | 1431.90 |
| ts04-033 | Worth ® supercell est/cryogenic/34"/27 oz/softball | 1683.40 | 1689.93 | 1686.67 |
| ts04-034 | Easton ® z-core/−3/titanium/graphite reinforced sc777/34"/31 oz/mdl.bz71-2/baseball | 2320.11 | 2173.16 | 2246.64 |
| ts04-035 | Worth ® 3dx/−3/34"/31 oz/model 3dxab/baseball | 2166.02 | 2087.44 | 2126.73 |
| ts04-036 | Easton ® Connexion ™/−3/32"/29 oz/baseball | 1518.40 | 1565.50 | 1541.95 |
| ts04-037 | Baum ® aaa-pro/33"/33 oz/baseball | 1895.87 | 1991.07 | 1943.47 |
| ts04-038 | Louisville Slugger ® TPX ™/gen1x/−3/33"/30 oz/model cb203/baseball | 2313.61 | 2299.33 | 2306.47 |
| ts04-039 | Easton ® z2k/−3/graphite reinforced sc500 scandium/mdl.bz2-kc/baseball | 2707.45 | 2656.00 | 2681.72 |
| ts04-040 | Easton ® (all aluminum)/youth baseball bat/31" | 1328.10 | 1323.59 | 1325.84 |
| ts04-041 | Easton ® Connexion ™ z-core/34"/26 oz/mdl. st1-2/softball | 1111.51 | 1151.69 | 1131.60 |
| ts04-042 | Worth ® Wicked ™/34"/28 ox/model wwsc/softball | 1330.71 | 1375.98 | 1353.34 |
| ts04-043 | Easton ® synergy/34" 28 oz/mdl. Scx2/softball | 1005.63 | 992.40 | 999.02 |

TABLE 2-continued

RESISTANCE TO BENDING ALONG A LONGITUDINAL AXIS OF ASSEMBLED BATS

| Test Sample # | Sample Description | Resistance to Bending (lbs/in) | | |
|---|---|---|---|---|
| | | Test a | Test b | Average |
| ts04-044 | Louisville Slugger ® TPS/air attack 3/34"/28 oz/model sb22/softball | 1990.48 | 1891.51 | 1940.99 |
| ts04-045 | Louisville Slugger ® TPS/air c555/−10.5 oz/34"/model fp25/fastpitch | 1868.15 | 1835.37 | 1851.76 |
| ts04-046 | Mizuno ® techfire/victory stage/33"/model 2tp-50340/softball | 2727.27 | 2780.90 | 2754.09 |
| ts04-047 | Easton ® cxn Connexion ™/sc888/29"/18.5 oz/mdl. lt8-z/youth baseball | 1094.30 | 1183.22 | 1138.76 |
| ts04-048 | Easton ® Connexion ™/youth baseball bat/31" | 1128.07 | 1120.31 | 1124.19 |
| ts04-004 | DeMarini ® Sample No. 9 | 306.44 | 306.40 | 306.42 |
| ts03-191 | DeMarini ® Sample No. 10 | 529.59 | 464.58 | 497.08 |
| ts03-040 | DeMarini ® Sample No. 11 | 668.60 | 674.12 | 671.36 |
| wcb-32-1 | DeMarini ® Sample No. 12 | 894.84 | 928.07 | 911.46 |
| wcb-33-1 | DeMarini ® Sample No. 13 | 906.95 | 944.00 | 925.48 |
| ts03-151 | DeMarini ® Sample No. 14 | 1176.81 | 1164.74 | 1170.78 |
| ts03-107 | DeMarini ® Sample No. 15 | 2347.97 | 2348.82 | 2348.40 |

Easton ® is a registered trademark of Jas. D. Easton, Inc. Connexion ™ is a trademark of Easton Sports, Inc. Worth ® is a registered trademark of Worth, Inc. Wicked ™ is a trademark of Worth, Inc. Baum ® is a registered trademark of Baum Research & Development Company, Inc. Louisville Slugger ® is a registered trademark of Hillerich & Bradsby, Co. TPS ™ and TPX ™ are trademarks of Hillerich & Bradsby, Co. Mizuno ® is a registered trademark of Mizuno Corp.

Table 2 illustrates bats having different stiffnesses, or different resistance to bending values, of a number of ball bats. Table 2 also illustrates the reduced resistance to bending of the bats of DeMarini Samples 9-13. The DeMarini Samples are configured in accordance with the present invention and provide for resistance to bending values that are significantly lower than those measured on existing ball bats. The DeMarini Samples 1-7 and 9-13 of Tables 1 and 2 illustrate only a few of the variations in handle stiffness or resistance to bending contemplated under the present invention.

As stated above, the present invention enables the bat to be produced with significantly less stiffness, greater flexibility, and significantly better feel to the player, without negatively affecting the batting performance of the bat. The present invention enables one of ordinary skill in the art to vary the composition of the bat to produce a bat that is optimally configured, adjusted or tuned to meet the needs of a particular player. The present invention also enables one of ordinary skill in the art to produce a bat that optimizes flexibility and, through the direct connection between the handle member and the striking member, maximizes energy transfer between the handle and striking members, and the power output of the bat.

It should be noted that examples set out herein are only exemplary in nature, and should not be considered limiting as to the structure and method of manufacture of bats according to the invention. For example, although the bat has been described with a metal striking member and a composite handle member, such a wide difference in materials for the two members may not be necessary. For example, the striking member and the handle member both may be made of composite material, but with constructions which provide varying operational or functional characteristics beneficial for the specific portion of the bat which they form.

The present invention also includes a method of categorizing a plurality ball bats or bat models (two or more) based, at least in part, upon the stiffness, or the resistance to bending of the bat along its longitudinal axis. The method includes creating at least two distinct bat categories, or groupings of bats, based upon at least one bat characteristic. The at least two bat categories or groupings of bats can be two, three, four or more categories or groups. The at least one bat characteristic includes at least the resistance to bending of the frame of the bat along the longitudinal axis of the bat, or the resistance to bending of the handle portion of the frame of the bat along the longitudinal axis of the bat. Preferably, the at least one bat characteristic used to create the two or more categories or groupings of bats is two or more bat characteristics, wherein the second characteristic is the weight of the bat, the length of the bat, the application the bat was configured for, the material of the handle portion of the bat, and the material of the frame of the bat. Further characteristics of the ball player for which a particular bat is intended for also can be used. Such characteristics can include a batter's skill level, a batter's swing speed, a batter's experience level, a batter's strength, a batter's age, and a batter's size. Still further, the application for which the bat is intended for can also be used as one of the additional characteristics used to define the categories.

The method also includes determining the resistance to bending of either the frame or the handle portion for the plurality of bats, or bat models. This resistance to bending along the longitudinal axis of the bat, or handle portion of the bat, can be accomplished through actual testing or through use of design specifications. The method further includes assigning one of the at least two categories to each of the plurality of bats based, at least in part, upon either the resistance to bending of the frame or the resistance to bending of the handle portion. The method of testing for the resistance to bending of the bat frame or the handle portion of the frame is preferably accomplished using one of the three, three-point bend stiffness test approaches described above. Accordingly, the above-described method facilitates provided the bat that best fits a particular player. In other words, the bat can be flex-tuned to a particular player. For example, youth baseball bats may be configured with handle portions having a lower resistance to bending along the longitudinal axis of the bat than adult baseball bats. In other example, the youth baseball bats may be categorized with different stiffness levels, or different levels of resistance to bending, in order to appropriately match a bat to a particular youth player. One youth model would be stiff, the second less stiff, and the third even less stiff, or more flexible.

Many embodiments of ball bats built in accordance with the present application are specifically configured for providing optimum performance in all levels of competitive, organized play. For example, many embodiments of ball bats built in accordance with the present application fully meet the bat standards and/or requirements of one or more of the following baseball and softball organizations: Amateur Softball Association of America ("ASA") Bat Testing and Certification Program Requirements (including the current ASA 2004 Bat Standard and the ASA 2000.Bat Standard); United States Slo-Pitch Softball Association ("USSSA") Bat Performance Standards for baseball and softball; International Softball Federation ("ISF") Bat Certification Standards; National Softball Association ("NSA") Bat Standards; Independent Softball Association ("ISA") Bat Requirements; Ball Exit Speed Ratio ("BESR") Certification Requirements of the National Federation of State High School Associations ("NFHS") and the National Collegiate Athletic Association ("NCAA"); Little League Baseball Bat Equipment Evaluation Requirements; PONY Baseball/Softball Bat Requirements; Babe Ruth League Baseball Bat Requirements; and American Amateur Baseball Congress ("AABC") Baseball Bat Requirements. Accordingly, the term "bat configured for organized, competitive play" refers to a bat that fully meets the ball bat standards and/or requirements of, and is fully functional for play in, one or more of the above listed organizations.

In constructing the bat of the illustrated embodiment the striking member 12 may be formed as set out above. End 12b initially remains cylindrical, without the bent over portion as illustrated in FIG. 1.

The tubular handle member may be formed by wrapping sheets of preimpregnated composite material on a mandrel. A first layer is wrapped on the mandrel, followed by a second layer, etc., until the desired number of layers have been wrapped on the mandrel in the desired positions and orientations to form the tubular handle member. The mandrel has a configuration which produces both the elongate substantially cylindrical gripping portion 32 and the diverging frusto-conical juncture section 34.

To form projecting ribs 40, and referring to FIGS. 7-9, after a sufficient number of layers of preimpregnated composite material have been wrapped onto the mandrel, a plurality of forming members indicated generally at 70, 72, 74 having a selected arcuate configuration are placed on the outside of the juncture section of the handle member while the composite material is still malleable. FIG. 7 shows members 70, 72, 74 prior to placement on the outside of the juncture section 34 and the placement of such is illustrated in dashed outline in FIG. 7. As is seen members 70, 72, 74 do not extend fully about the juncture section when placed thereon, but instead have gaps therebetween.

Members 70, 72, 74 have a thickness substantially equal to the desired projection for ribs 40 and the space between adjacent edges of elements 70, 72, 74 is the desired width of ribs 40.

As mentioned previously, the projections may be in forms other than elongate ribs and other molding or forming members may be provided to achieve the desired projection configurations.

When the forming members are placed against the juncture section as noted, the tubular member then may be wrapped in shrink tape and placed in an oven between 250 and 300 F for about 45 minutes to one hour. The shrink tape preferably is temperature resistant and has high shrinkage and compaction capability when heated. As the shrink tape contracts it presses the composite layers into a desired configuration about the forming mandrel and presses members 70, 72, 74 into the composite material as seen in FIG. 8 to form depressions between areas which become projecting ribs 40. The depressions are indicated generally at 76, 78, 80, respectively, having a depth equal to the thickness of members 70, 72, 74. FIG. 9 illustrates the configuration thus produced when members 70, 72, 74 are removed.

Heating the handle member speeds the curing process, but it may be allowed to cure at a lower temperature for a longer period of time. For example, the handle member may be allowed to cure at room temperature for several days. The pressure applied by the shrink tape may range from 15 to 150 psi depending both on the type of the shrink tape used and the flow properties of the matrix material used. Alternately, some other known apparatus may be used to pressurize the handle member during curing, such as a bladder or a vacuum bag.

The handle member (or striking member if chosen to do so) also may be formed of a chopped fiber slurry. The chopped fibers can be carbon, glass, fiberglass, boron, or various metals.

Although not illustrated in the figures, it should be recognized that other methods may be used for forming the handle and providing a desired series of projections thereon. One method of doing so is to wrap sheets of pre-impregnated composite material onto a mandrel as previously described to form the general configuration for the handle with its cylindrical gripping portion and flared frusto-conical juncture section. The materials wrapped on the mandrel then may be placed in a clam shell style mold having the desired external configuration for the handle, including forms to produce a selected pattern of projections thereon. After the clam shell mold has been placed about the exterior of the handle, the forming mandrel is removed, a pressure bladder is inserted where the mandrel previously had been, and pressure is applied on the bladder to force the wrapped materials outwardly against the mold. The materials then are allowed to cure and are removed from the mold with the desired external configuration.

Although the handle member has been described using a plurality of sheets of impregnated composite material, the layers may be formed by some other method, such as a filament winding process. With a filament winding process, a continuous fiber, rather than a preimpregnated sheet as described above, is wrapped around a mandrel. The filament winding process may use a preimpregnated fiber. Alternately, the continuous fiber may run through a resin bath before it is wrapped onto the mandrel. The filament winding process typically winds the fiber in a helical path along the mandrel, making it difficult to produce a layer having fibers that are exactly 90 degrees relative to the longitudinal axis of the layers. Thus the layers may include layers that are at an angle substantially 90 degrees, but not exactly at 90 degrees.

The handle member, being produced of composite material, permits selective production to obtain a handle member of the desired weight while still obtaining the necessary strength and stiffness.

In an alternative preferred embodiment, the handle member can be formed of a thermoplastic material, as described above. The handle member formed of a thermoplastic material can be produced through injection molding. The injection molding process includes the steps of obtaining a mold having a cavity configured for the desired structure, such as the handle member. The mold cavity is then filled with the thermoplastic material under heat and pressure. The thermoplastic material can include fiber reinforcement, and/or it can be formed of a combination of thermoplastic materials. The thermoplastic material is then allowed to cure. After curing, the structure (the handle member) is removed from the mold. If a fiber-reinforced thermoplastic material is used, the injection process can be configured to orientate a significant portion the fibers, or fiber segments, in a particular direction. As such, the handle member formed of a thermoplastic material can be generally anisotropic. Preferably, the handle member formed of a thermoplastic material is formed to be generally isotropic (wherein the fibers, or fiber segments, are randomly configured). Alternatively, a thermoplastic or fiber-reinforced thermoplastic handle member or bat frame can be produced through other methods, such as, for example compression molding.

After the handle member has been formed it is inserted through the open end 12b of striking member 12, such that gripping portion 32 extends longitudinally outwardly from end 12a of the striking member. Prior to inserting the handle member a layer of adhesive is applied either to the outer surface of juncture section 34 of the handle member or the inner surface of juncture section 14 of the striking member. The striking member 12 and handle 30 are urged in opposite directions along the longitudinal axis, such that the juncture section 34 of the handle member is forced into tight engagement with the interior surface of juncture section 16. As this occurs, the adhesive applied between the parts is pressed into recesses 76, 78, 80 and ribs 40, or other projections, firmly contact, or engage, the inner surface of juncture section 16. Excess adhesive will be allowed to flow outwardly from end 30a of the handle member, with only the selected thickness of adhesive remaining.

It has been found that an adhesive such as Scotch-Weld™ DP-100 epoxy adhesive or PT 1000 urethane adhesive from Willamette Valley Co., of Eugene, Oreg., works well in this application. Other appropriate adhesives also may be used. In a preferred embodiment, projections 40 extend outwardly from remainder portions of the outer surface of the juncture section of the handle member in a range of 0.001 to 0.010 inch, and more preferably in a range of 0.002 to 0.005 inch and have a width in a range of 0.125 to 0.75 inch and more preferably in a range of 0.2 to 0.3 inch. The layer of adhesive will have a thickness generally equal to height of the projections and is allowed to cure and form a substantially rigid, firm interconnection between the striking member and the handle member. The substantially rigid interconnection between the juncture sections of the striking member and handle member provided by the adhesive and direct engagement of the projections with the inner surface of the striking member permits substantially complete striking energy transfer between the handle member and the striking member.

After the handle member has been secured to the striking member, insert 22 is inserted into the striking member, the outer end 12b is rolled over into the configuration illustrated in FIG. 1, and stop member 50 is inserted therein. Transition member 52 (when used) is attached to provide a smooth transition between the inner end 12a of the striking member and handle 30.

Prior to, or following, assembly of the handle member and striking member, weighted member, or plug, 54 is inserted and secured in the proximal end portion of the handle member as shown in FIG. 1.

Weighted plug 54 is a generally cylindrical member coupled to the proximal end 30b of the handle member 30. The weighted plug preferably is sized to fit snugly within the proximal end 30b of the handle member 30 and preferably is affixed to the proximal end 30b with a suitable adhesive. Alternative means for coupling the plug 54 to the proximal end 30b of the handle member 30 also are contemplated, such as, for example, press-fit connections, fasteners, and other mechanical latching mechanisms. The weighted plug 54 is formed of a relatively dense material, preferably a metal. Alternatively, the weighted plug 54 can be formed of other materials, such as, for example, sand, a fluid or a polymeric material. The plug 54 is formed with a weight in the range of 0.5 to 7.0 ounces, and preferably within a range of 2 to 5 ounces, and a length in the range of 1.0 to 4.0 inches.

The weighted plug 54 places additional weight, or mass, generally directly beneath the player's grip during swinging, thereby facilitating the player's ability to swing the bat and to increase his or her bat speed. The weighted plug 54 provides the player with a pivot point, which facilitates rotation of the bat about the mass or grip location of the player.

Additionally, the weighted plug 54 also serves to dampen, or substantially reduce, the shock, vibration and "sting" commonly felt by a player when hitting a ball, particularly when the ball is hit away from a desired hitting region of the striking member, or the "sweet spot." The weighted plug 54 serves as a vibration sink that substantially lowers the amplitude of the vibrational energy generated upon impact of the bat 10 with a ball at the location of the plug 54 thereby reducing the vibration or shock felt by the player. In another alternative preferred embodiment, the plug 54 is integrally formed with the knob 48.

The use of the weighted plug 54 is just one example of the advantages achieved in the present invention from redistributing the weight, or mass, within the bat 10 through decoupling of the handle member 30 and the striking member 12. When forming the handle member 30 of a composite material, the weight of the handle member 30 can be reduced from that of a conventional metal handle member. This weight can then be redistributed to other locations on the bat, such as at the proximal end of the handle member 30 to improve, or tune, the performance of the bat 10. In the present invention, the weighted plug 54 can be added to the bat 10 to enable the player to increase his or her bat speed, and to reduce the shock and vibration felt by the user, without excessively or unnecessarily increasing the weight of the bat 10. In another alternative preferred embodiment, weight can be redistributed to the striking member 12.

The method described herein and the bat produced provide a bat which has improved striking capabilities. Such improved striking capabilities are provided by the structural characteristics of the bat. In one instance increased bat swing speed is allowed by producing a bat with a handle which is lighter than would be the case if it were made of the same material or in a manner similar to the striking portion of the bat. This reduction in weight of the handle in relation to the striking portion and providing a substantially rigid interconnection between the two permits increased bat speed and substantially complete striking energy transfer between the striking member and the handle member. Further it provides desirable weight distribution in the bat with the greatest effective mass in the striking region and lower effective mass in the handle.

It also has been found that the slugging, or hitting, characteristics of the bat may be varied by mating various composite handle members with striking members of different materials or configurations, with a substantially rigid interconnection therebetween. Thus different models of bats may be produced, tuned to selected requirements.

By providing a bat constructed with an independently produced striking member and handle member which are rigidly interconnected at a juncture region, bats may be made with numerous selected functional characteristics. The striking member may be made of materials which provide optimum ball striking effectiveness, while the handle member may be constructed in such a fashion that is allows the batter to impart the maximum possible force from the batter's hands to the bat and to produce the greatest swing speed. The handle member may be laid up from a variety of composite materials with selected thicknesses, orientations, and positions within the handle member to produce desired strength, weight, stiffness, etc., in the overall handle or even within selected regions of the handle.

Explaining further, selected regions of the handle may have a greater or lesser number of layers of composite material than other regions, the thicknesses or structural materials within the layers may vary at different regions of the handle member, and other characteristics may be varied through selected lay up of materials in the handle member during production.

As an example of desirable differences in handle members which may be formed, it has been found that certain bats, such as for softball use, will work better with a stiffer handle member, whereas for baseball a more flexible, or less stiff, handle member is preferable.

In one preferred embodiment, the handle member 30 of the bat 10 can be formed of a thermoplastic material, a fiber reinforced thermoplastic and combinations thereof. A thermoplastic material becomes soft and moldable when heated and changes back to solid when allowed to cool. Examples of thermoplastics are nylon, urethane, ABS, polyvinylchloride, polyethylene, polypropylene acetal, acrylic, cellulose acetate, nylon, polystyrene, vinyl, and combinations thereof. Thermoplastic materials that are flexible even when cool are known as thermoplastic elastomers or TPEs. When thermoplastic materials are heated, the linked chains of molecules can move relative to each other, allowing the mass to flow into a different shape. Cooling prevents further flow. Although the heating/cooling cycle can be repeated, recycling reduces mechanical properties and appearance.

In contrast to thermoplastic materials, thermoset materials or plastics experience a chemical change during processing and become hard solids. Although the structures of thermoset materials are similar to those of thermoplastic materials, processing develops permanent cross-links between adjacent molecules, forming complex networks that prevent relative movement between the chains at any temperature. Examples of thermoset materials include amino, epoxy, phenolic, and unsaturated polyesters. Many rubbers that are processed by vulcanizing, such as butyl, latex, neoprene, nitrile, polyurethane, and silicone, also are classified as thermosets. Heating a thermoset degrades the material so that it cannot be reprocessed satisfactorily.

The handle member 30 can be formed separately from, or integrally with, the striking member 12. The fiber reinforced thermoplastic material can include fibers formed of glass, fiberglass, aramid, carbon, Kevlar®, high molecular weight polyethylene in strand form, or other conventional fiber materials. Preferably, a highly damped thermoplastic or fiber-reinforced thermoplastic material is used. The highly damped thermoplastic or fiber-reinforced thermoplastic retains some flexibility which allows for the handle member to exhibit the low resistance to bending values. In one example, the highly damped thermoplastic material used to form the handle member can be an injection molded urethane including approximately 40-50 percent glass fibers (handle members TP306, TP606 and TP706 of Table 3 include this construction). In other embodiments, other highly damped thermoplastic materials, and other percentages of the fiber material and/or other fiber material can be used. In another example, nylon can be used as the thermoplastic material with approximately 10 percent glass fibers. In this example, the thermoplastic nylon material exhibits lower damping characteristics.

Many embodiments of the present application, including bats formed with thermoplastic handles, provide the benefit of generally having low resistance to bending values, such as the ranges listed above including 800-900 lbs/in, 700-800 lbs/in, 600-700 lbs/in, 500-600 lbs/in, 400-500 lbs/in, 300-400 lbs/in, 200-300 lbs/in, 100-200 lbs/in and 10-100 lbs/in. The thermoplastic material and/or fiber-reinforced thermoplastic material can also provide exceptional frequency and damping characteristics, particularly in the first and second bending modes of vibration. The first and second bending modes are generally responsible for the feel or sensations felt by batters, particularly when contacting the ball away from the sweet spot. A modal analysis test can be performed to measure the damping ratio and frequency characteristics, including the first and second bending modes. It is important to note that not all thermoplastic materials or fiber-reinforced materials provide a high level of damping. Many embodiments of ball bats formed with thermoplastic, or fiber-reinforced thermoplastic, handle members are configured for organized competitive play.

Bats including a handle member 30 formed of a highly damped thermoplastic material, a highly damped fiber reinforced thermoplastic material, or other highly damped materials, are capable of providing the batter with exceptional feel, while still maintaining exceptional hitting or power transfer performance. Further, such highly damped bats provide the batter with a more controlled feel. During use, many conventional bats exhibit excessive vibration, oscillation and/or modulation following impact with the ball. Such movement can leave a batter with a feeling of having less control over the movement of the bat because the batter can receive a sensation indicating that the barrel is moving outside of his or her control. Such sensations can reduce a player's confidence level at the plate and his or her confidence level in controlling the position of the bat during his or her swing. The highly damped bats of the present application significantly reduce such oscillation, vibration and movement of the bat after impact thereby providing the batter with a greater sense of control. One unexpected result of the embodiments of the present application having bat handles formed of a highly damped material is that damping typically connotes a reduction or absorption of energy. In the present invention, the damping can greatly improve the feel and control of the bat without negatively affecting the bat's performance for all levels of play, including organized, competitive play.

In one preferred embodiment, the handle member 30 is formed of a thermoplastic material, and/or fiber-reinforced thermoplastic material, wherein the damping ratio in the first bending mode of vibration is greater than or equal to 0.010, when tested in accordance with the modal analysis test described below. The first bending mode frequency associated with first bending mode damping ratio is less than or equal to 320 Hz and greater than or equal to 50 Hz. In one preferred embodiment, the first bending mode frequency is less than or equal to 280 Hz and greater than or equal to 100 Hz. In another preferred embodiment, the first bending mode frequency is less than or equal to 260 Hz and greater than or equal to 140 Hz. The damping ratio in the second bending mode of vibration is also equal to or greater 0.010, when tested in accordance with the modal analysis test described below. The second bending mode frequency associated with second bending mode damping ratio is less than or equal to 1000 Hz and greater than or equal to 450 Hz. In one preferred embodiment, the second bending mode frequency is less than or equal to 930 Hz and greater than or equal to 500 Hz. In another preferred embodiment, the second bending mode frequency is less than or equal to 710 Hz and greater than or equal to 500 Hz. In an alternative preferred embodiments, the handle member can be formed of a thermoplastic material or fiber-reinforced thermoplastic material exhibiting a damping ratio in the first and/or second modes of vibration of greater than or equal to 0.015, 0.020 or 0.022, also within the frequency ranges described above. Each one of these damping ratio values can result in a ball bat that meets a particular application and/or a particular player's needs. In other alternative preferred embodiments, a non-thermoplastic material can be used such as, for example, a thermoset material, provided that the handle of the bat has a damping ratio in the first and second bending modes of at least 0.010.

Figure 15:
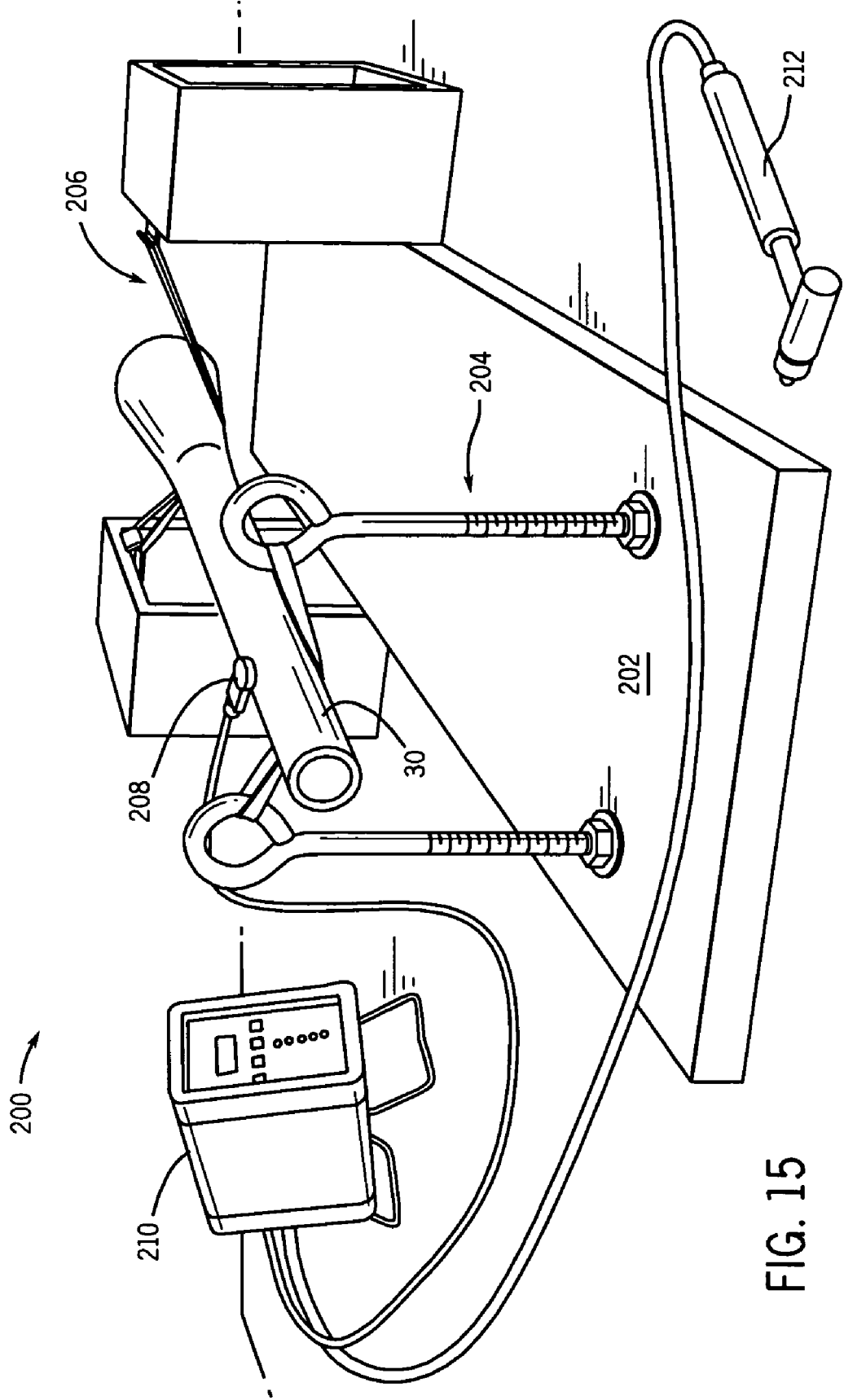
FIG. 15 is a side elevation view of a test fixture for testing the frequency and damping ratio of a handle portion of a bat.

Referring to FIG. 15, one method of performing a modal analysis test on a handle member 30 of a bat is illustrated.

Although FIG. 15 illustrates a handle member 30 supported by the modal test assembly 200, the modal test assembly 200 can also be used to test an entire bat including, for example, a bat having a one-piece bat frame. The modal analysis test assembly 200 includes a base 202 for supporting first and second support assemblies 204 and 206 and the handle member 30. The base 202 can be any structure that properly supports the first and second support assemblies. The first and second support assemblies 204 and 206 each include a pair of spaced apart rigid supports and a flexible member spanning between the pair of supports. The flexible member can be a rubber band. The first and second support assemblies 204 and 206 suspend the test object, such as the handle member 30, in a substantially horizontal position and provide a substantially "free-free" boundary condition.

The modal analysis test assembly 200 further includes an accelerometer 208, a power conditioner 210, a PC data acquisition card, data acquisition software, modal analysis software, memory, and an impulse force hammer 212. The accelerometer 208 is removably attached to the handle member 30 and operably coupled to the power conditioner 210. The power conditioner 210 is operably connected to the PC data acquisition card. The PC data acquisition card can be a Model DAP4000a/112 from Microstar Laboratories of Bellevue, Wash. or equivalent. The accelerometer 208 has a measurement range of +/−500 g and can be a Model 352C22 produced by PCB Piezotronics™ of Depew, N.Y., or an equivalent. The power conditioner can be a Type 5134A produced by Kistler Instrument Corporation of Amhurst, N.Y. or equivalent. The PC data acquisition card includes the data acquisition software and is capable of processing at least 400,000 samples per second per channel. The data acquisition software can be LabView™ software from National Instruments of Austin, Tex., or equivalent. The impulse force hammer 212 is operably coupled to the power conditioner 210 and is used to generate a force pulse through impact of the hammer to the handle member 30. The impulse test hammer can be a Model 9722A-2000 produced by Kistler Instrument Corporation of Amhurst, N.Y. or equivalent. The impulse force hammer 212 includes a load cell for measuring the load applied to the bat, or handle member, during impact.

The modal analysis test includes determining the natural frequencies of vibration of the bat and the associated damping at each of these frequencies. The mode shape of the bat or the handle member for each of these natural frequencies can also be determined. Preferably, all vibration damping devices are removed from the test object. In bats wherein the handle member is formed separately from the striking member, the handle member is preferably tested apart from the striking member. Further, some bats include added weights placed within the inner bore of the handle member. These added weights are also preferably removed. The knob of the bat handle is also typically removed; however, the test may be performed with the knob attached to the handle member. The test object (the bat handle or the bat as a whole) is initially marked at one inch increments along its longitudinal axis. The test object is suspended on the flexible members of the first and second support assemblies 204 and 206 in a substantially horizontal position. The accelerometer 208, operably engaged to the power conditioner 210, is placed at a location between two of the one inch increments on the test object. The impulse force hammer 212 is then used to sequentially impact (excite) the test object at the one inch increment markings on the bat with sufficient time intervals between impacts to avoid overlapping response signals. The excitation of the test object at numerous locations allows for the mode shape of the test object to be accurately approximated. If the accelerometer is positioned at a node, the accelerometer requires repositioning to a new location and the test is repeated. The PC data acquisition card processes the signal from the load cell of the impulse force hammer 212 along with the response data of the accelerometer 208. The impulse force hammer impact data and accelerometer response data for each individual impact location is stored in a data file.

A modal analysis computer program utilizing Matlab® software from The MathWorks, Inc. of Natick, Mass. can be used. Alternatively, modal analysis programming can be performed using StarModel™ software from Spectral Dynamics of San Jose, Calif. or equivalent. A modal analysis is performed on the data points using the load and excitation data from each impact location with the handle or bat to determine the natural frequencies of the test object, the damping ratios associated with each natural frequency and the mode shape associated with each natural frequency. Test objects (a bat handle or a bat frame) contain many natural frequencies and each frequency has an associated damping value. The natural frequencies and damping values with each of these frequencies can be determined through modal analysis.

Figure 16:
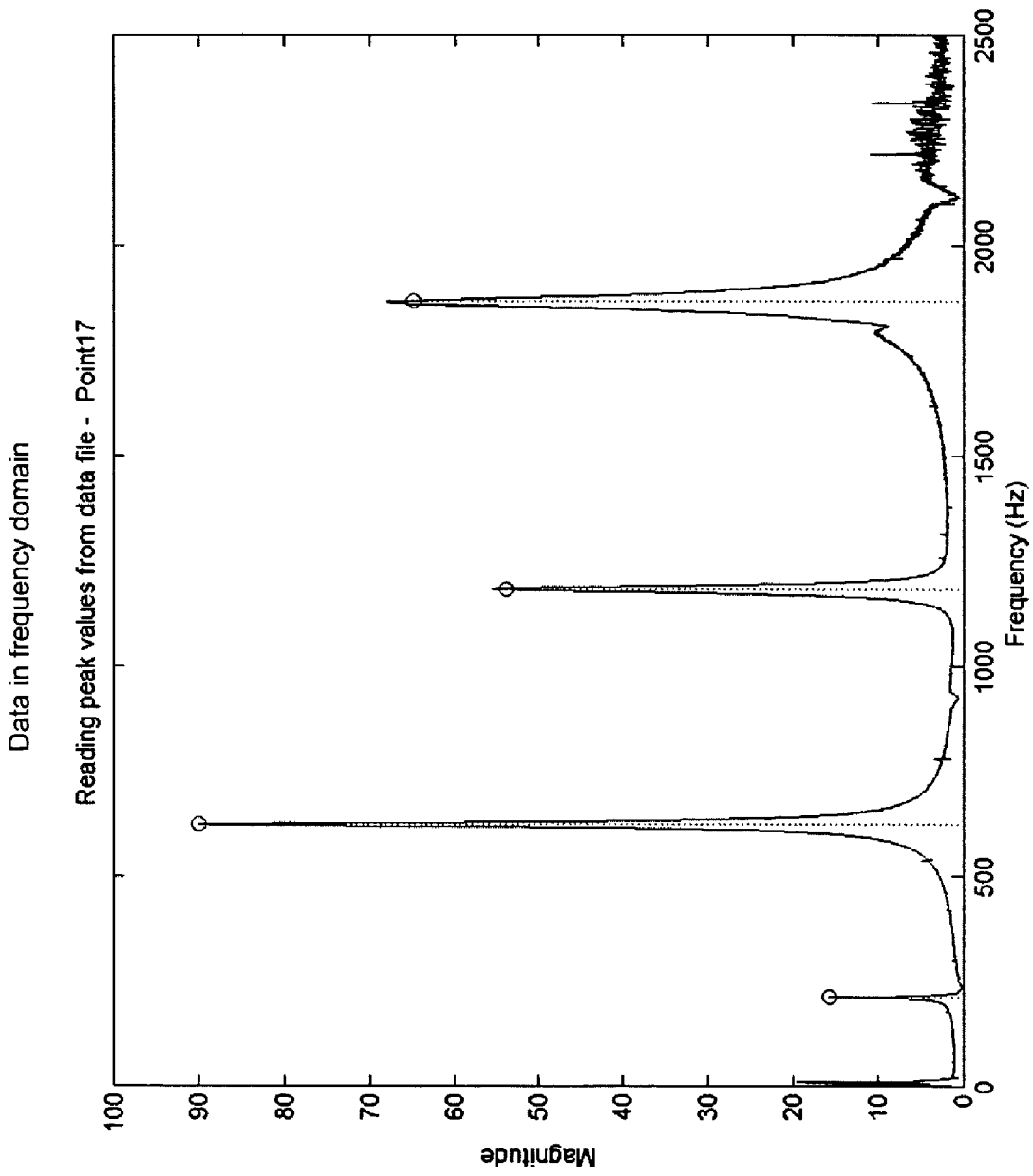
FIG. 16 is a table illustrating bat handle excitation data in a frequency domain.
Figure 17:
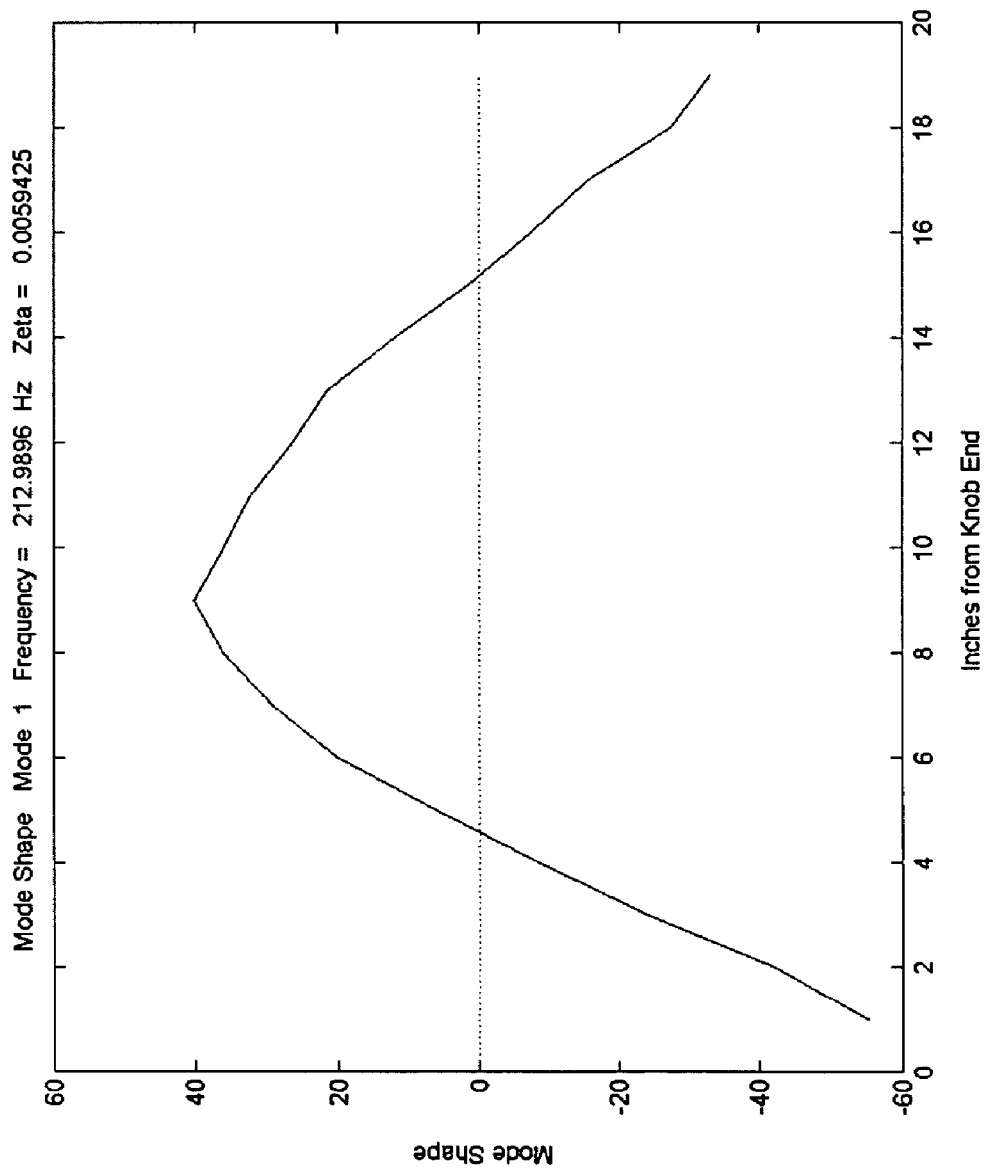
FIG. 17 is a table illustrating a first bending mode shape of a handle member including frequency and damping.
Figure 18:
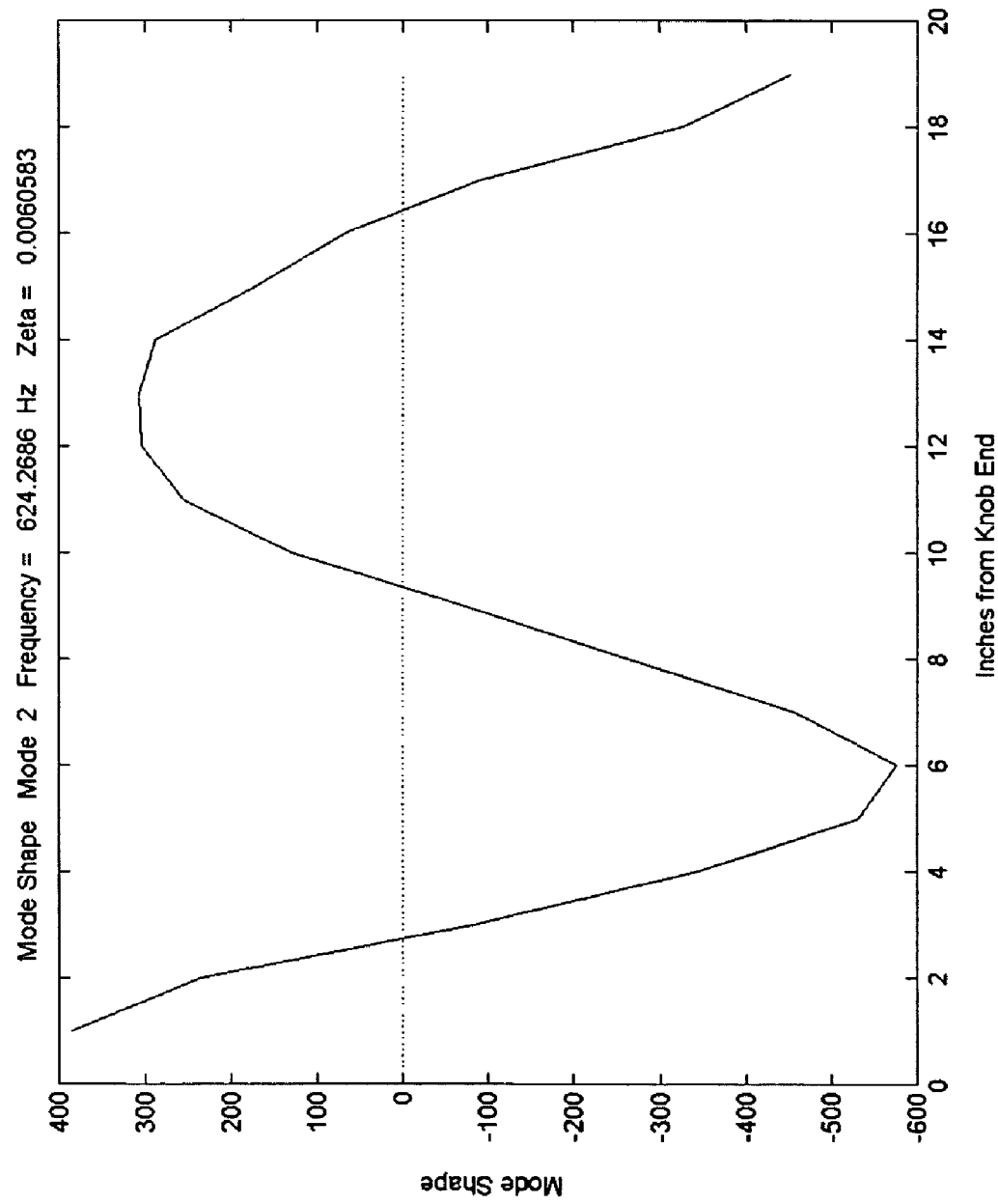
FIG. 18 is a table illustrating a second bending mode shape of a handle member including frequency and damping.

The frequency response of the test object is obtained by taking the fast Fourier transformation ("fft") of the measured input force from the impulse force hammer 212 and the resulting acceleration of the test object obtained from the accelerometer 208. The fft converts the response of the test object from the time domain (the excitation of the test object over time in response to the impact by the hammer) into the frequency domain where the signal is divided into discrete magnitude and frequency components. The output frequency response is normalized by dividing by the input frequency response. The normalization of the output frequency response accounts for the variability of the input force (of the impulse force hammer) from trial to trial (impact to impact). From the normalized output frequency response, frequency response peaks can be identified. The identification of the frequency response peaks can be performed using software, manually from visually inspecting graphical information or from reading peak values from a data file. FIG. 16 illustrates an example of bat excitation data in the frequency domain from an impact point location 17. Once the frequency response peaks are located, the calculation of the natural frequencies and damping ratios can be carried out using an inverse line fit method or a circle fit method. The inverse line fit method is preferred. A calculated modal natural frequency and damping ratio value is determined for each of the impulse hammer impact points along the test object. The natural frequencies and damping ratios remain generally constant no matter where the test object is excited, unless the excitation occurs at a node (zero value). The frequency response for each data set can be combined to calculate the mode shape of the test object. FIGS. 17 and 18 illustrate examples of $1^{st}$ and $2^{nd}$ bending mode shapes of the test object, respectively. The frequency and damping are also illustrated for each mode.

Modal analysis of handle members illustrates the increased damping at the $1^{st}$ and $2^{nd}$ bending modes, and the reduced $1^{st}$ and $2^{nd}$ bending mode vibration levels, of bats formed with highly damped thermoplastic material. Table 3 provides a listing of frequency and damping ratios in the $1^{st}$ and $2^{nd}$ bending modes for several different handle members of bats. The first grouping lists three separate handle members formed of a highly damped fiber-reinforced thermoplastic material. This first grouping illustrates the high damping ratio values and low frequencies obtained through the use of highly damped thermoplastic materials. These handle members when assembled in bats provide the batter with an exceptional feel and optimal hitting and/or slugging performance. The negative vibration, oscillation and shock often experienced by batters during off-center impacts with a ball (away from the sweet spot of the bat) are significantly damped and reduced enabling the user to feel more confident and focused at the plate and providing the user with a greater sense of control over the bat. Table 3 also lists, in a second grouping, the bending mode frequency and damping ratios of two handle members formed of less damped thermoplastic materials. Table 3 further lists a third grouping of handle members of bats formed of a thermoset composite material. Finally, a fourth grouping of Table 3 lists bats having handle members formed of metal. Some of the bats in the third and fourth groupings include one-piece bat frames. Accordingly, in order to test the handle member only, the one-piece bat frames were cut or sectioned in a transverse direction at a location where the tapered section of the bat (or handle member) reached a predetermined outside diameter (preferably, an outside diameter within the range of 1.9 to 2.25 inches).

TABLE 3

$1^{ST}$ & $2^{ND}$ BENDING MODE FREQUENCY AND DAMPING RATIO VALUES OF HANDLE MEMBERS

| Handle Member Description | $1^{st}$ Bending Mode | | $2^{nd}$ Bending Mode | |
|---|---|---|---|---|
| | Frequency | Damping Ratio | Frequency | Damping Ratio |
| TP306 | 239.24 | 0.022515 | 696.91 | 0.024787 |
| TP606 | 253.07 | 0.027664 | 702.14 | 0.024580 |
| TP706 | 229.41 | 0.023544 | 638.18 | 0.026412 |
| TP506 (with knob) | 166.38 | 0.004218 | 521.38 | 0.005868 |
| TP506 | 212.99 | 0.005570 | 624.27 | 0.006543 |
| Easton ® Stealth ™ | 346.54 | 0.005712 | 970.50 | 0.003789 |
| DeMarini ® F2 ™ | 313.97 | 0.003163 | 919.88 | 0.003821 |
| Miken ® Ultra ™ | 648.28 | 0.002539 | 1857.20 | 0.004556 |
| Mizuno ® Techfire ™ | 597.28 | 0.001366 | 1676.70 | 0.002357 |
| DeMarini ® Vexxum ™-3 | 238.82 | 0.002654 | 723.21 | 0.001571 |
| Easton ® (metal) | 475.97 | 0.000444 | 1366.90 | 0.000428 |
| Worth ® (metal) | 396.65 | 0.000391 | 1159.50 | 0.000099 |
| DeMarini ® (metal) | 461.10 | 0.000335 | 1317.50 | 0.000142 |

Easton ® is a registered trademark of Jas. D. Easton, Inc. Worth ® is a registered trademark of Worth, Inc. Mizuno ® is a registered trademark of Mizuno Corp.

Table 3 illustrates that the handle members formed of a highly damped fiber-reinforced thermoplastic material (the first grouping) have damping ratios in the first and second bending modes that are an order of magnitude higher than handle members formed without thermoplastic material and handle members formed of less damped fiber-reinforced thermoplastic material. The handle members of the first group provide a significantly higher level of damping than the other bat handle members tested. Further, the handle members formed of a thermoplastic material exhibit first and second bending mode frequencies that are lower than the first and second bending mode frequencies of handle members formed of non-thermoplastic materials.

All the bats listed in Table 3 are designed for use in softball or baseball. The additional handle weight and the isolation union were removed from handle member of the Easton® Stealth™ bat prior to testing. The isolation union was also removed from the Easton® metal bat prior to testing. A handle weight was also removed from the Miken® Ultra™ bat prior to testing. The handle portions were cut from the Miken® Ultra™ bat, the Mizuno® Techfire™ bat and the Worth® metal bat prior to testing.

With the structure and method for producing such set out herein, a bat may be optimized for the selected usage by selection of materials and lay up for the various components of the bat.

While there have been illustrated and described preferred embodiments of the present invention, it should be appreciated that numerous changes and modifications may occur to those skilled in the art and it is intended in the appended claims to cover all of those changes and modifications which fall within the spirit and scope of the present invention.

What is claimed is:

1. A bat capable of being tested with a modal analysis test assembly having first and second supports assemblies, the bat comprising:
   an elongate tubular striking member having a distal end, a proximal end, and a striking region intermediate the distal and proximal ends; and
   a separate handle member having a distal end and a proximal end, the handle member coupled to the striking member, the handle member being formed of a thermoplastic or fiber-reinforced thermoplastic material, the handle member having a damping ratio in the first bending mode of greater than or equal to 0.010 in a modal analysis test wherein the handle member is supported by the first support assembly adjacent the distal end of the handle member and the second support assembly adjacent the proximal end of the handle member,
   the bat configured for organized, competitive play.

2. The bat of claim 1, wherein the damping ratio of the handle member in the first bending mode is greater than or equal to 0.015.

3. The bat of claim 1, wherein the damping ratio of the handle member in the first bending mode is greater than or equal to 0.020.

4. The bat of claim 1, wherein the damping ratio of the handle member in the first bending mode is greater than or equal to 0.022.

5. The bat of claim 1, wherein the handle member has a first bending mode frequency of greater than or equal to 50 Hz and less than or equal to 320 Hz.

6. The bat of claim 1, wherein the handle member has a first bending mode frequency of greater than or equal to 100 Hz and less than or equal to 280 Hz.

7. The bat of claim 1, wherein the handle member has a first bending mode frequency of greater than or equal to 140 Hz and less than or equal to 260 Hz.

8. The bat of claim 1, wherein the handle member is configured for testing in a three-point bend stiffness test device having first and second supports, and wherein the handle member has a resistance to bending along a longitudinal axis in the range of 10-900 lbs/in a three-point bend stiffness test wherein the handle member is transversely supported in a first direction by the first and second supports spaced apart a selected distance, with the first support adjacent the distal end of the handle member and the second support adjacent the proximal end of the handle member, and the handle member is transversely loaded in a second direction, opposite the first direction, at a location on the handle member in a region between 30% and 40% of the selected distance from the distal end of the handle member.

9. The bat of claim 8, wherein the handle member has a resistance to bending along the longitudinal axis in the range of 400-900 lbs/in.

10. The bat of claim 8, wherein the handle member has a resistance to bending along the longitudinal axis in the range of 600-700 lbs/in.

11. The bat of claim 8, wherein the handle member has a resistance to bending along the longitudinal axis in the range of 500-600 lbs/in.

12. The bat of claim 8, wherein the handle member has a resistance to bending along the longitudinal axis in the range of 400-500 lbs/in.

13. The bat of claim 8, wherein the handle member has a resistance to bending along the longitudinal axis in the range of 300-400 lbs/in.

14. The bat of claim 8, wherein the handle member has a resistance to bending along the longitudinal axis in the range of 200-300 lbs/in.

15. The bat of claim 8, wherein the handle member has a resistance to bending along the longitudinal axis in the range of 100-200 lbs/in.

16. The bat of claim 8, wherein the handle member has a resistance to bending along the longitudinal axis in the range of 10-100 lbs/in.

17. The bat of claim 1, wherein the handle member comprises fiber-reinforced urethane, and wherein the fibers are selected from the group consisting of glass, aramid, carbon, Kevlar®, polyethylene and combinations thereof.

18. The bat of claim 1, wherein the thermoplastic material of the handle member comprises nylon, polyester, ABS, polyvinylchloride, polyethylene, polypropylene, acetal, acrylic, cellulose acetate, polystyrene, vulcanized rubber, latex, neoprene, nitrile, silicone, and combinations thereof.

19. The bat of claim 1, wherein the handle member is firmly joined adjacent its distal end to the proximal end of the striking member to provide a rigid interconnection therebetween to permit substantially complete striking energy transfer between the handle member and the striking member.

20. The bat of claim 1, wherein the bat has an overall first length, wherein the striking member has a second length, wherein the handle member has a third length, and wherein the second and third lengths are each shorter than the first length.

21. The bat of claim 1, wherein the striking member is formed from a material selected from the group consisting of a metal, wood, a fiber composite material, and a non-metallic material.

22. The bat of claim 1, which further comprises a second tubular member concentric with the striking region of the striking member.

23. The bat of claim 22, wherein the second tubular member is configured to move independently of the striking member upon impact with a ball.

24. A bat capable of being tested with a modal analysis test assembly having first and second supports assemblies, the bat comprising:
a non-wooden, one-piece bat frame including a distal end, a proximal end, an elongate tubular striking portion and a handle portion, the handle portion including a tapered region, the handle portion being formed of a thermoplastic or fiber-reinforced thermoplastic material, the handle portion having a damping ratio in the first bending mode of greater than or equal to 0.010 in a modal analysis test wherein the handle portion is cut away from the striking portion at a first location where the tapered region of the handle portion has an outer diameter within the range of 1.9 to 2.25 inches and wherein the handle portion is supported by the first support assembly adjacent the proximal end of the bat frame and the second support assembly at the tapered region of the handle portion, the bat configured for organized, competitive play.

25. The bat of claim 24, wherein the damping ratio of the handle portion in the first bending mode is greater than or equal to 0.015.

26. The bat of claim 24, wherein the damping ratio of the handle portion in the first bending mode is greater than or equal to 0.020.

27. The bat of claim 24, wherein the damping ratio of the handle portion in the first bending mode is greater than or equal to 0.022.

28. The bat of claim 24, wherein the handle portion has a first bending mode frequency of greater than or equal to 50 Hz and less than or equal to 320 Hz.

29. The bat of claim 24, wherein the handle portion has a first bending mode frequency of greater than or equal to 100 Hz and less than or equal to 280 Hz.

30. The bat of claim 24, wherein the handle portion has a first bending mode frequency of greater than or equal to 140 Hz and less than or equal to 260 Hz.

31. The bat of claim 24, wherein the handle portion is configured for testing in a three-point bend stiffness test device having first and second supports, and wherein the handle portion has a resistance to bending along a longitudinal axis in the range of 10-900 lbs/in a three-point bend stiffness test wherein the handle portion is transversely supported in a first direction by the first and second supports spaced apart a selected distance, with the first support adjacent the distal end of the handle portion and the second support adjacent the proximal end of the handle portion, and the handle portion is transversely loaded in a second direction, opposite the first direction, at a location on the handle portion in a region between 30% and 40% of the selected distance from the distal end of the handle portion.

32. The bat of claim 31, wherein the handle portion has a resistance to bending along the longitudinal axis in the range of 400-900 lbs/in.

33. The bat of claim 31, wherein the handle portion has a resistance to bending along the longitudinal axis in the range of 600-700 lbs/in.

34. The bat of claim 31, wherein the handle portion has a resistance to bending along the longitudinal axis in the range of 500-600 lbs/in.

35. The bat of claim 31, wherein the handle portion has a resistance to bending along the longitudinal axis in the range of 400-500 lbs/in.

36. The bat of claim 31, wherein the handle portion has a resistance to bending along the longitudinal axis in the range of 300-400 lbs/in.

37. The bat of claim 31, wherein the handle portion has a resistance to bending along the longitudinal axis in the range of 200-300 lbs/in.

38. The bat of claim 31, wherein the handle portion has a resistance to bending along the longitudinal axis in the range of 100-200 lbs/in.

39. The bat of claim 31, wherein the handle portion has a resistance to bending along the longitudinal axis in the range of 10-100 lbs/in.

40. The bat of claim 24, wherein the handle portion comprises fiber-reinforced urethane, and wherein the fibers are selected from the group consisting of glass, aramid, carbon, Kevlar®, polyethylene and combinations thereof.

41. The bat of claim 24, wherein the thermoplastic material of the handle portion comprises nylon, polyester, ABS, polyvinylchloride, polyethylene, polypropylene, acetal, acrylic, cellulose acetate, polystyrene, vulcanized rubber, latex, neoprene, nitrile, silicone, and combinations thereof.

42. The bat of claim 24, which further comprises a tubular member concentric with the striking region of the striking portion.

43. The bat of claim 42, wherein the tubular member is configured to move independently of the striking portion upon impact with a ball.

44. A bat capable of being tested with a modal analysis test assembly having first and second supports assemblies and in a three point bend stiffness test device having first and second supports, the bat comprising:

an elongate tubular striking member having a distal end, a proximal end, and a striking region intermediate the distal and proximal ends; and a separate handle member having a distal end and a proximal end, the handle member coupled to the striking member, the handle member having first and second damping ratios in the first and second bending modes, respectively, of greater than or equal to 0.020 in a modal analysis test wherein the handle member is supported by the first support assembly adjacent the distal end of the handle member and the second support assembly adjacent the proximal end of the handle member, the handle member having a first bending mode frequency of greater than or equal to 100 Hz and less than or equal to 280, and a second bending mode frequency of greater than or equal to 450 and less than or equal to 1000 Hz, and the handle member having a resistance to bending along a longitudinal axis in the range of 10-900 lbs/in a three-point bend stiffness test wherein the handle member is transversely supported in a first direction by the first and second supports spaced apart a selected distance, with the first support adjacent the distal end of the handle member and the second support adjacent the proximal end of the handle member, and the handle member is transversely loaded in a second direction, opposite the first direction, at a location on the handle member in a region between 30% and 40% of the selected distance from the distal end of the handle member.

the bat configured for organized, competitive play.

45. The bat of claim 44, wherein the first and second damping ratios of the handle member in the first and second bending modes, respectively, are each greater than or equal to 0.022.

46. The bat of claim 44, wherein the handle portion is formed of a thermoplastic or fiber-reinforced thermoplastic material.

47. The bat of claim 44, wherein the handle member has a resistance to bending along the longitudinal axis in the range of 400-900 lbs/in.

48. The bat of claim 44, wherein the handle member is firmly joined adjacent its distal end to the proximal end of the striking member to provide a rigid interconnection therebetween to permit substantially complete striking energy transfer between the handle member and the striking member.

49. The bat of claim 44, wherein the bat has an overall first length, wherein the striking member has a second length, wherein the handle member has a third length, and wherein the second and third lengths are each shorter than the first length.

* * * * *